United States Patent
Hwang et al.

(10) Patent No.: US 10,484,852 B2
(45) Date of Patent: Nov. 19, 2019

(54) METHOD AND NB-IOT DEVICE FOR RECEIVING DOWNLINK PHYSICAL CHANNEL ON TDD SPECIAL SUBFRAME

(71) Applicant: LG Electronics Inc., Seoul (KR)

(72) Inventors: Seunggye Hwang, Seoul (KR); Changhwan Park, Seoul (KR); Seokmin Shin, Seoul (KR); Joonkui Ahn, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/383,103

(22) Filed: Apr. 12, 2019

(65) Prior Publication Data
US 2019/0239057 A1     Aug. 1, 2019

Related U.S. Application Data

(63) Continuation of application No. PCT/KR2018/007771, filed on Jul. 10, 2018.
(Continued)

(30) Foreign Application Priority Data

Apr. 5, 2018    (KR) .................. 10-2018-0039820
May 18, 2018    (KR) .................. 10-2018-0057457

(51) Int. Cl.
*H04W 4/80*      (2018.01)
*H04W 72/04*      (2009.01)
(Continued)

(52) U.S. Cl.
CPC .............. *H04W 4/80* (2018.02); *H04L 5/0051* (2013.01); *H04L 5/1469* (2013.01);
(Continued)

(58) Field of Classification Search
CPC . H04W 4/80; H04W 72/0446; H04W 72/042; H04W 72/04; H04W 72/12;
(Continued)

(56) References Cited

U.S. PATENT DOCUMENTS 10,045,325 B2*   8/2018   Yoon ................. H04L 5/005
2016/0150545 A1*   5/2016   Tayloe ............... H04L 1/0004
                                                     370/329
2016/0226649 A1*   8/2016   Papasakellariou .... H04L 5/0057

FOREIGN PATENT DOCUMENTS

KR       20170009225      1/2017
WO     WO2016048027      3/2016
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 14)," 3GPP TS 36.211 V14.2.0, dated Mar. 23, 2017, 50 pages.
(Continued)

*Primary Examiner* — Sharad Rampuria
(74) *Attorney, Agent, or Firm* — Fish & Richardson P.C.

(57) ABSTRACT

One disclosure of the present specification provides a method for receiving a downlink physical channel by a narrowband Internet of things (NB-IoT) device. The method may comprise the steps of: determining whether to receive a signal of a downlink physical channel from an NB-IoT cell, on a downlink pilot time slot (DwPTS) of a time division duplex (TDD) special subframe; and receiving the signal of the downlink physical channel on the TDD special subframe including the DwPTS, on the basis of the determination.

10 Claims, 47 Drawing Sheets

Related U.S. Application Data

(60) Provisional application No. 62/592,374, filed on Nov. 29, 2017, provisional application No. 62/591,205, filed on Nov. 28, 2017, provisional application No. 62/586,211, filed on Nov. 15, 2017, provisional application No. 62/543,380, filed on Aug. 10, 2017, provisional application No. 62/531,365, filed on Jul. 12, 2017.

(51) Int. Cl.
*H04L 5/00* (2006.01)
*H04L 5/14* (2006.01)

(52) U.S. Cl.
CPC ..... *H04W 72/042* (2013.01); *H04W 72/0446* (2013.01); *H04L 5/0007* (2013.01)

(58) Field of Classification Search
CPC .... H04W 76/00; H04L 5/1469; H04L 5/0051; H04L 5/0007; H04B 7/2121; H04B 7/2123; H04J 2203/0069; H04Q 2213/394
See application file for complete search history.

(56) References Cited

FOREIGN PATENT DOCUMENTS

| WO | WO2017043801 | 3/2017 |
| WO | WO2017057870 | 4/2017 |

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.4.0 (Dec. 2011), 101 pages.

\* cited by examiner

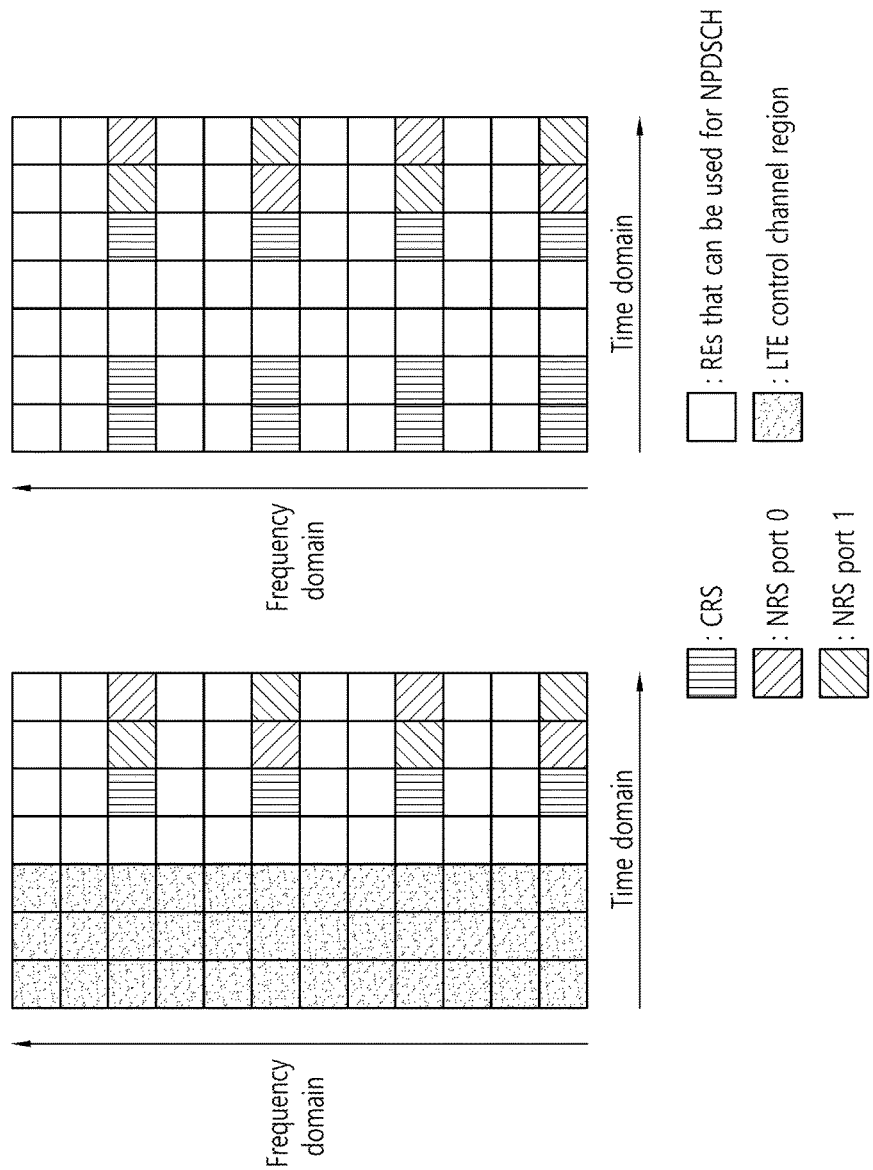

FIG. 17A
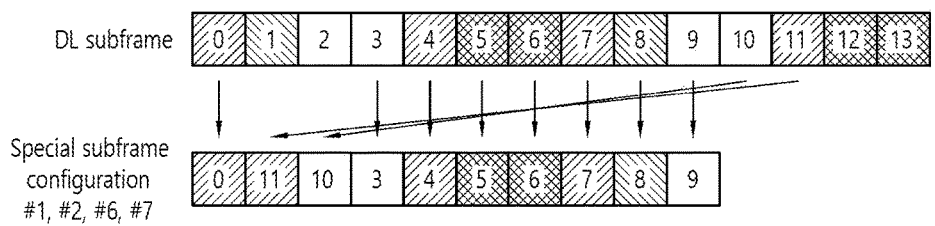
(a) Interleaving pattern when 6th and 7th symbol is used for NRS transmission within DwPTS
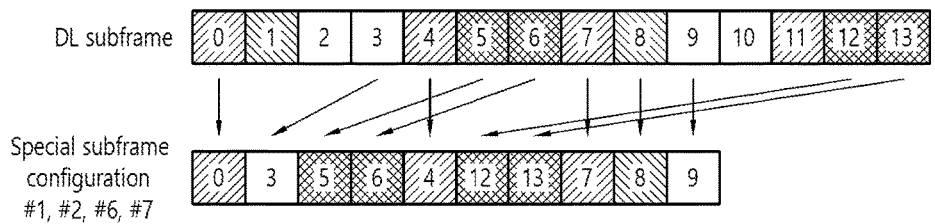
(b) Interleaving pattern when 3rd, 4th, 6th and 7th symbol is used for NRS transmission within DwPTS
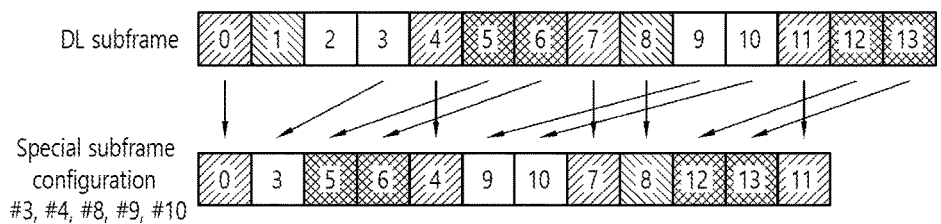
(c) Interleaving pattern when 3rd, 4th, 10th and 11th symbol is used for NRS transmission within DwPTS
 : CRS (Antenna port= 1, 2, 4)    : NRS (Antenna port= 1, 2)
 : CRS (Antenna port= 4)    : No RS FIG. 17B
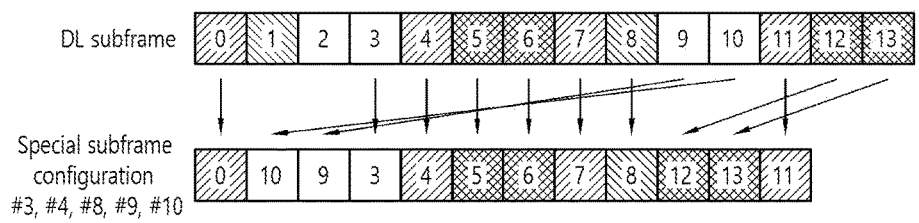
(d) Interleaving pattern when 6rd, 7th, 10th and 11th symbol is used for NRS transmission within DwPTS
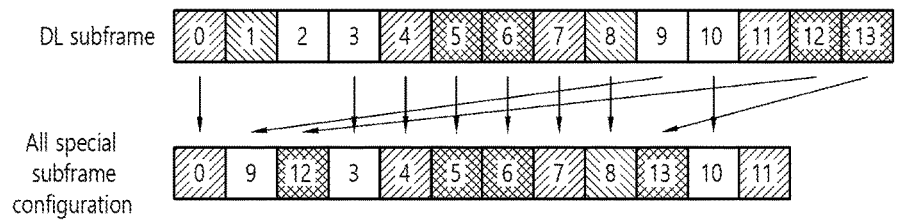
(e) Interleaving pattern when 3rd, 6th, 7th and 10th symbol is used for NRS transmission within DwPTS
 : CRS (Antenna port= 1, 2, 4)    : NRS (Antenna port= 1, 2)
 : CRS (Antenna port= 4)    : No RS

FIG. 18A
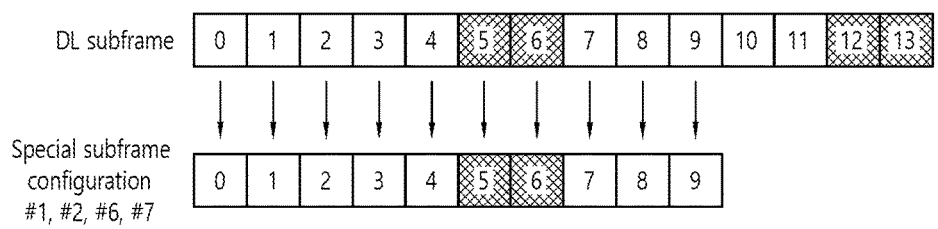
(a) Interleaving pattern when 6th and 7th symbol is used for NRS transmission within DwPTS
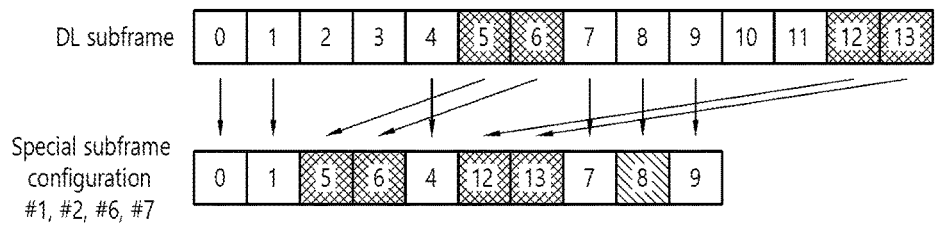
(b) Interleaving pattern when 3rd, 4th, 6th and 7th symbol is used for NRS transmission within DwPTS
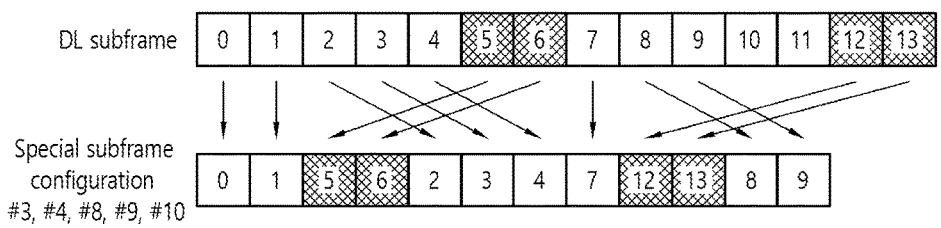
(c) Interleaving pattern when 3rd, 4th, 10th and 11th symbol is used for NRS transmission within DwPTS
▨ : NRS (Antenna port= 1, 2)
☐ : No RS

FIG. 18B
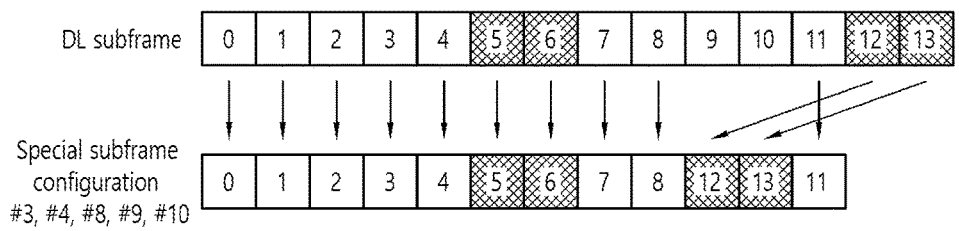
(d) Interleaving pattern when 6rd, 7th, 10th and 11th symbol is used for NRS transmission within DwPTS
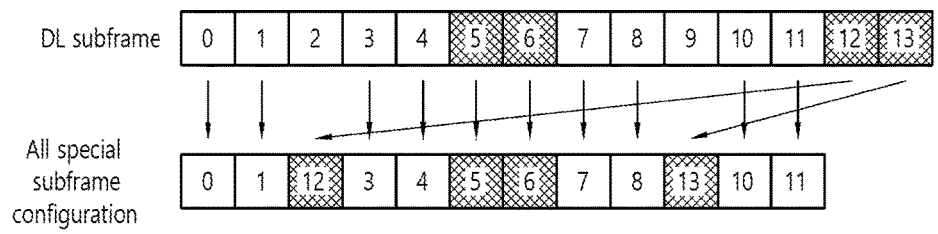
(e) Interleaving pattern when 3rd, 6th, 7th and 10th symbol is used for NRS transmission within DwPTS
▨ : NRS (Antenna port= 1, 2)
☐ : No RS

FIG. 29

METHOD AND NB-IOT DEVICE FOR RECEIVING DOWNLINK PHYSICAL CHANNEL ON TDD SPECIAL SUBFRAME

CROSS-REFERENCE TO RELATED APPLICATIONS

Pursuant to 35 U.S.C. § 119(e), this application is a continuation of International Application No. PCT/KR2018/007771, filed on Jul. 10, 2018, which claims the benefit of U.S. Provisional Application No. 62/531,365, filed on Jul. 12, 2017, U.S. Provisional Application No. 62/586,211, filed on Nov. 15, 2017, U.S. Provisional Application No. 62/591,205, filed on Nov. 28, 2017, U.S. Provisional Application No. 62/592,374, filed on Nov. 29, 2017, U.S. Provisional Application No. 62/543,380, filed on Aug. 10, 2017, Korean Application No. 10-2018-0039820, filed on Apr. 5, 2018, and Korean Application No. 10-2018-0057457, filed on May 18, 2018. The disclosures of the prior applications are incorporated by reference in their entirety.

BACKGROUND OF THE INVENTION

Field of the Invention

The present invention relates to mobile communication.

Related Art

Recently, researches on a technology for communication between machines or between a machine and a server without involving human interaction or human intervention, namely Machine Type Communication (MTC) are being carried out actively. MTC refers to the concept that machines, not terminals used by humans, communicate with each other by using an existing wireless communication network. Meanwhile, since the legacy LTE system has been designed to support high-speed data communication, it has been regarded as an expensive communication method. Considering its nature, however, MTC may be widely used only when it is implemented at a low cost. Therefore, to reduce the cost, a method for reducing the bandwidth for MTC to be smaller than that of the system bandwidth has been studied.

Also, recently, to support Internet of Things (IoT) communication, expanding or increasing cell coverage of a base station is under consideration, and various techniques are being studied as means for that purpose. To expand or increase cell coverage, a downlink or uplink channel may be transmitted repeatedly on multiple subframes.

The downlink or uplink channel may also be repeated on TDD subframes.

Since the number of available Resource Elements (REs) of a TDD special subframe is smaller than the number of REs of a TDD downlink subframe, an effective method is needed to repeat the downlink or uplink channel. However, until now, no effective method has been proposed.

SUMMARY OF THE INVENTION

Accordingly, a disclosure of the present specification has been made in an effort to solve the aforementioned problem.

To achieve the object above, one disclosure of the present invention provides a method for receiving a downlink physical channel by a Narrowband Internet of Things (NB-IoT) device. The method may comprise determining whether to receive a signal of a downlink physical channel from an NB-IoT cell on a Downlink Pilot Time Slot (DwPTS) of a Time Division Duplex (TDD) special subframe; and receiving a signal of a downlink physical channel on the TDD special subframe including the DwPTS based on the determination.

The determination may be performed based on one or more of a size of the DwPTS and an operation mode of the NB-IoT cell. The operation mode may include one or more of stand-alone, in-band, and guard-band modes.

The downlink physical channel may include one or more of Narrowband Physical Downlink Shared Channel (NPDSCH) and Narrowband Physical Downlink Control Channel (NPDCCH).

The method may further comprise receiving a signal of the downlink physical channel repeatedly on a plurality of subframes including the TDD special subframe and TDD downlink subframe.

When a signal of the downlink physical channel is received repeatedly on the plurality of subframes, the signal of the downlink physical channel may be mapped to resource elements (REs) within a DwPTS of the TDD special subframe with reference to the TDD downlink subframe.

Part of the REs within the DwPTS to which the signal of the downlink physical channel has been mapped may be punctured.

The punctured RE may include a Guard Period (GP) or an RE used for an Uplink Pilot Time Slot (UpPTS).

When a signal of the downlink physical channel is received repeatedly on the plurality of subframes, and when the number of symbols of a control region within the TDD special subframe is smaller than the number of symbols of a control region within the TDD downlink subframe, the signal of the downlink physical channel mapped to an RE punctured for the GP or UpPTS may be mapped to an RE on at least one symbol within the TDD special subframe.

A signal of the downlink physical channel may be interleaved before the signal is mapped to an RE within the DwPTS.

When a signal of the downlink physical channel is received repeatedly on the plurality of subframes, and when an RE within the special subframe, the RE being at the same position with an RE to which the signal of the downlink physical channel is mapped within the TDD downlink subframe, has to be used for a Narrowband reference signal (NRS), the signal of the downlink physical channel may be punctured on the corresponding RE.

When a signal of the downlink physical channel is received repeatedly on the plurality of subframes, an RE within the special subframe, the RE being at the same position with an RE to which the signal of the downlink physical channel is not mapped within the TDD downlink subframe, may be used as a blank RE or used for an NRS.

When a signal of the downlink physical channel is received only on the TDD special subframe without repetition, the signal of the downlink physical channel may be rate matched with reference to the number of available REs within the DwPTS.

A Narrowband reference signal (NRS) may be mapped on a third, fourth, and seventh OFDM symbols within a first slot of the special subframe.

To achieve the object described above, one disclosure of the present specification also provides an NB-IoT device which receives a downlink physical channel. The NB-IoT device may comprise a transceiver; and a processor controlling the transceiver. The processor may be configured to determine whether to receive a signal of a downlink physical channel from an NB-IoT cell on a Downlink Pilot Time Slot (DwPTS) of a Time Division Duplex (TDD) special subframe; and receive a signal of a downlink physical channel on the TDD special subframe including the DwPTS, based on the determination. The determination by the processor may be performed based on one or more of a size of the DwPTS and an operation mode of the NB-IoT cell. The operation mode may include one or more of stand-alone, in-band, and guard-band modes.

According to the disclosure of the present invention, the problem of the conventional technology described above may be solved.

BRIEF DESCRIPTION OF THE DRAWINGS

FIG. 13 illustrates the position of an available RE according to a method of Section I-3-2.

FIGS. 17A and 17B illustrate an example of performing interleaving at the OFDM symbol level according to a DwPTS interleaving pattern by using a method of Section I-3-3 when the operation mode is in-band.

FIGS. 18A and 18B illustrate an example of performing interleaving at the OFDM symbol level according to a DwPTS interleaving pattern by using a method of Section I-3-3 when the operation mode is stand-alone or protection mode.

FIG. 29 illustrates TDD UL/DL configurations.

DESCRIPTION OF EXEMPLARY EMBODIMENTS

Figure 1:
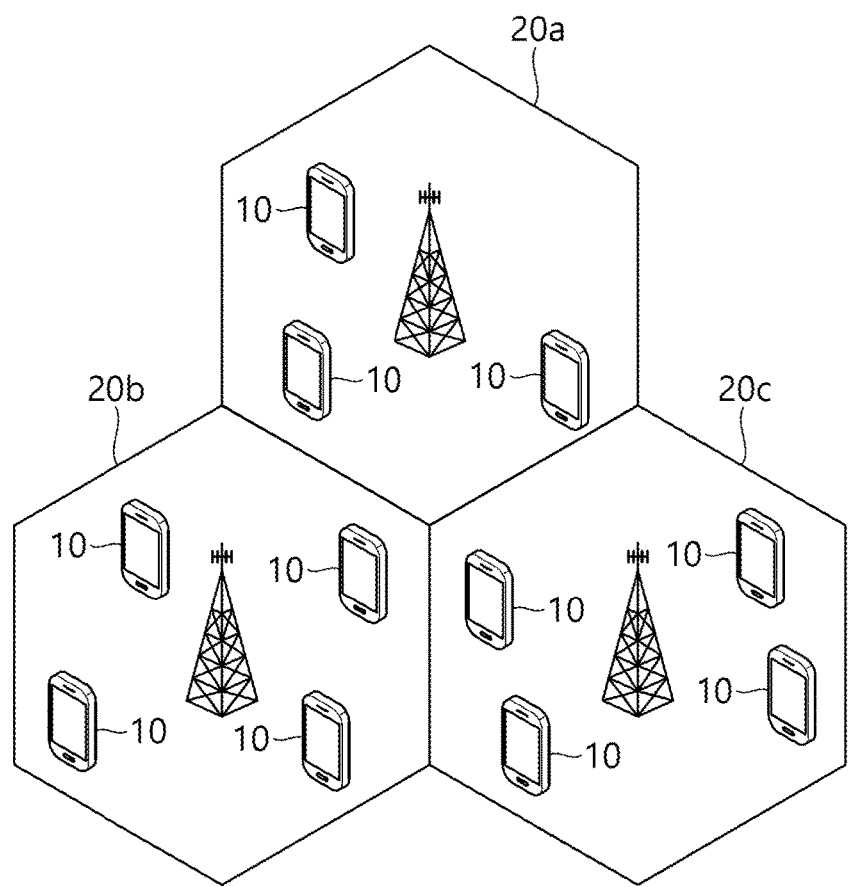
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

Hereinafter, the LTE system will be described in detail.

Figure 2:
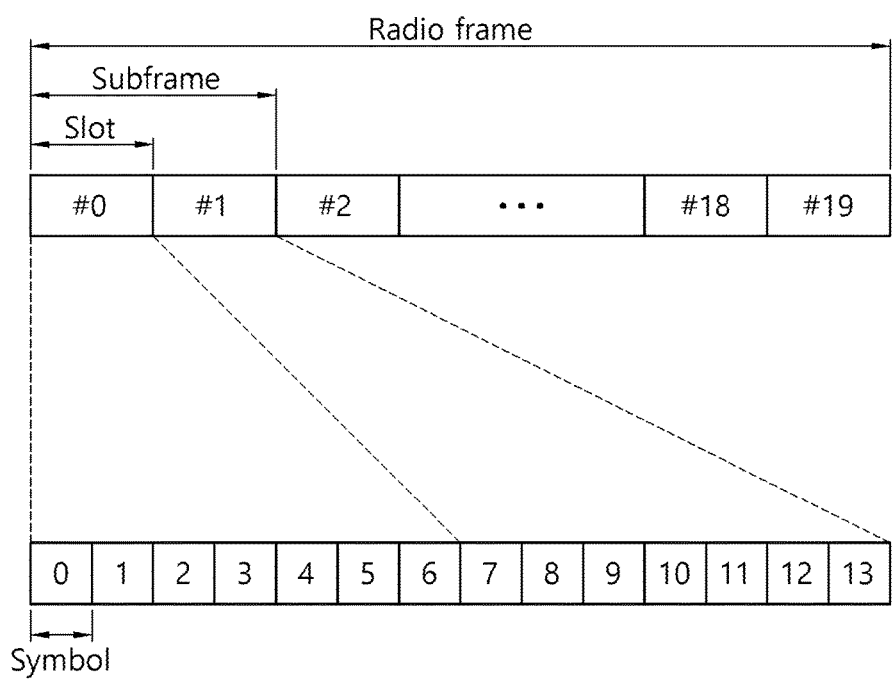
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
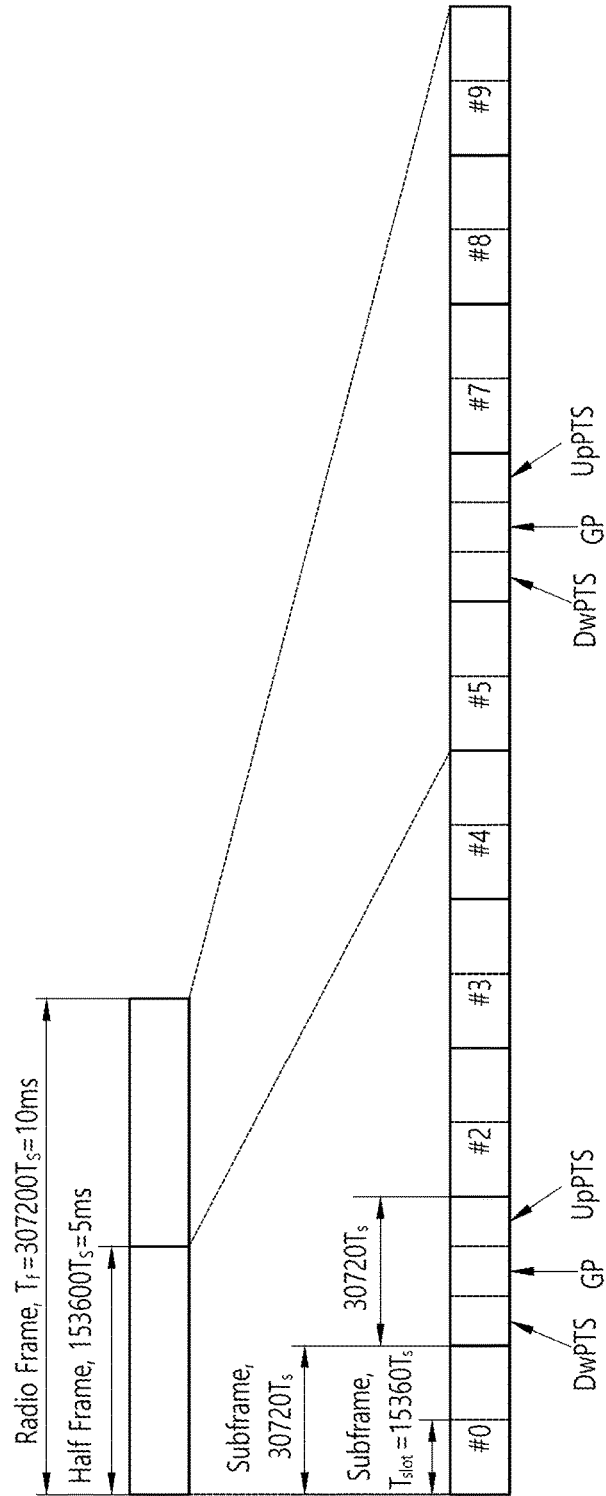
FIG. 3 illustrates the architecture of a downlink radio frame according to TDD in 3GPP LTE.

FIG. 3 illustrates the architecture of a downlink radio frame according to TDD in 3GPP LTE.

For this, 3GPP TS 36.211 V10.4.0 (2011-12) "Evolved Universal Terrestrial Radio Access (E-UTRA); Physical Channels and Modulation (Release 10)", Ch. 4 may be referenced, and this is for Time Division Duplex (TDD).

Subframes having index #1 and index #6 are denoted special subframes, and include a Downlink Pilot Time Slot (DwPTS), Guard Period (GP) and Uplink Pilot Time Slot (UpPTS). The DwPTS is used for initial cell search, synchronization, or channel estimation in a UE. The UpPTS is used for channel estimation in a base station and for establishing uplink transmission synchronization of a UE. The GP is a period for removing interference produced on an uplink due to a multi-path delay of a downlink signal between the uplink and a downlink.

In TDD, a downlink (DL) and an uplink (UL) subframe co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' an UL subframe, and 'S' a special subframe. When receiving an UL-DL configuration from a base station, a UE may know which subframe is a DL or an UL subframe according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | | |
| 5 | 6592*Ts | 4384*Ts | 5120*ts | 20480*Ts | 4384*Ts | 5120*Ts |
| 6 | 19760*Ts | | | 23040*Ts | | |
| 7 | 21952*Ts | | | — | | |

TABLE 2-continued

| | | Normal CP in downlink | | | Extended CP in downlink | |
| --- | --- | --- | --- | --- | --- | --- |
| Special | | UpPTS | | | DwPTS | |
| subframe configuration | DwPTS | Normal CP in uplink | Extended CP in uplink | DwPTS | Normal CP in uplink | Extended CP in uplink |
| 8 | 24144*Ts | | | — | | |
| 9 | 13168*Ts | | | — | | |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<IoT (Internet of Things) Communication>

Hereinafter, the IoT will be described.

Figure 4A:
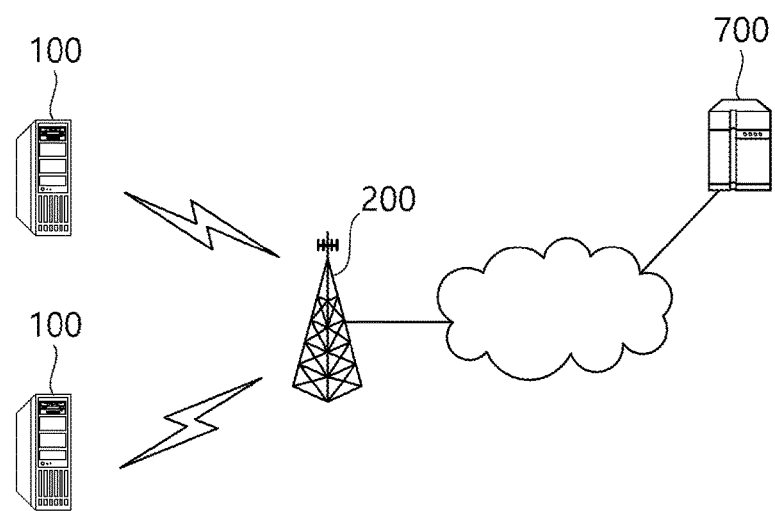
FIG. 4A illustrates an example of IoT (Internet of Things) communication.

FIG. 4A Illustrates an Example of IoT (Internet of Things) Communication.

The IoT refers to information exchange between the IoT devices 100 without human interaction through the base station 200 or information exchange between the IoT device 100 and the server 700 through the base station 200. In this way, the IoT communication may be also referred to as Cellular Internet of Things (CIoT) in that it communicates with a cellular base station.

Such IoT communication is a type of MTC (machine type communication). Therefore, the IoT device may be referred to as an MTC device.

The IoT service is distinct from the service in the conventional human intervention communication and may include various categories of services such as tracking, metering, payment, medical service, and remote control. For example, the IoT services may include meter reading, water level measurement, use of surveillance cameras, inventory reporting of vending machines, and so on.

Since the IoT communication has a small amount of data to be transmitted and uplink or downlink data transmission and reception rarely occur, it is desirable to lower the cost of the IoT device 100 and reduce battery consumption depending on a low data rate. Further, since the IoT device 100 has low mobility characteristics, the IoT device 100 has characteristics that the channel environment changes little.

Figure 4B:
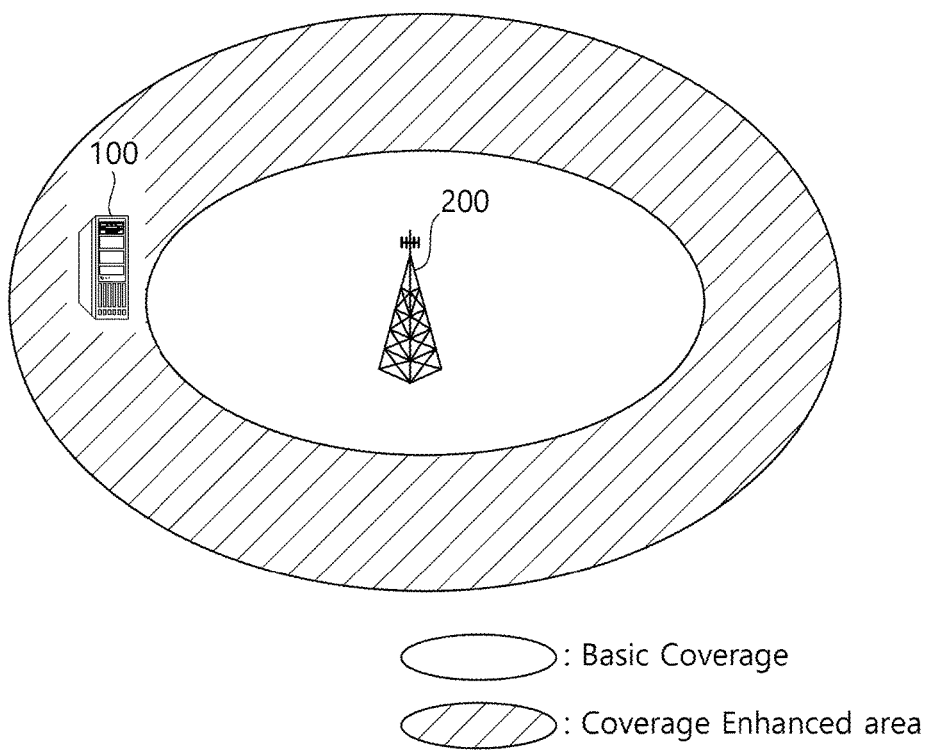
FIG. 4B is an illustration of cell coverage expansion or augmentation for an IoT device.

FIG. 4B is an Illustration of Cell Coverage Expansion or Augmentation for an IoT Device.

Recently, expanding or augmenting the cell coverage of the base station for the IoT device 100 has been considered, and various techniques for expanding or increasing the cell coverage have been discussed.

However, when the coverage of the cell is expanded or increased, if the base station transmits a downlink channel to the IoT device located in the coverage extension (CE) or coverage enhancement (CE) region, then the IoT device has difficulty in receiving it. Similarly, when an IoT device located in the CE region transmits an uplink channel, the base station has difficulty in receiving it.

In order to solve this problem, a downlink channel or an uplink channel may be repeatedly transmitted over multiple subframes. Repeating the uplink/downlink channels on multiple subframes is referred to as bundle transmission.

Figure 4C:
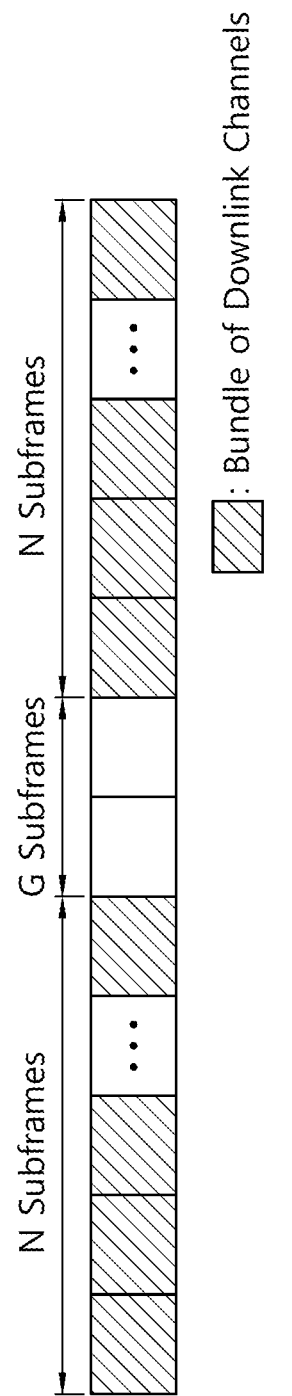
FIG. 4C illustrates an example of transmitting a bundle of downlink channels.

FIG. 4C Illustrates an Example of Transmitting a Bundle of Downlink Channels.

As may be known from FIG. 4C, a base station transmits a downlink channel (for example, PDCCH and/or PDSCH) repeatedly to an IoT device 100 located in a coverage extension area on several subframes (for example, N subframes).

Then the IoT device or base station receives a bundle of downlink/uplink channels on several subframes and improves a decoding success rate by decoding the whole or part of the bundle.

Figure 5A:
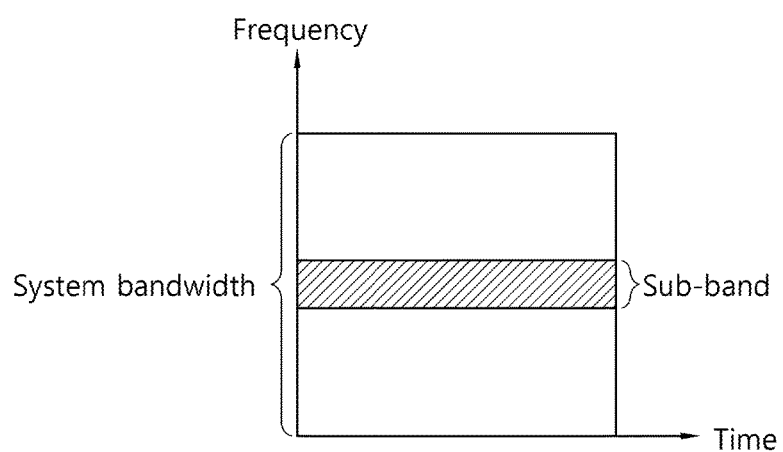
FIGS. 5A and 5B are diagrams illustrating examples of sub-bands in which IoT devices operate.
Figure 5B:
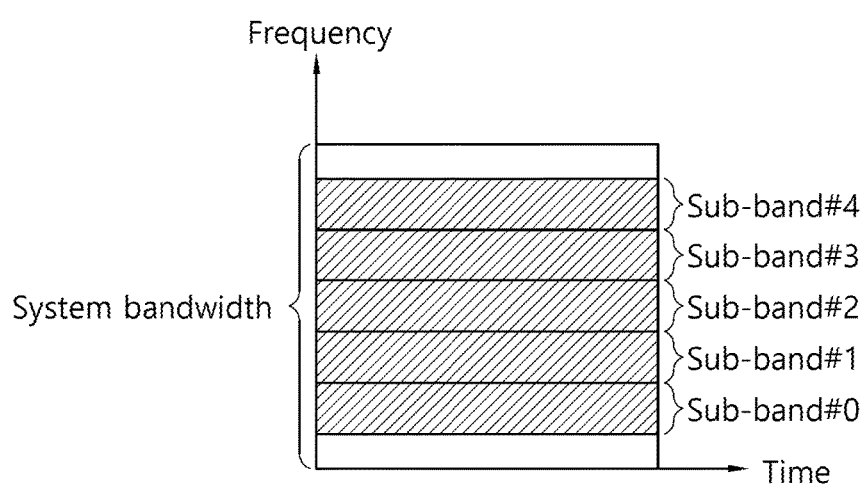

FIGS. 5A and 5B are Diagrams Illustrating Examples of Sub-Bands in which IoT Devices Operate.

As one method for low-cost IoT devices, regardless of the system bandwidth of the cell as shown in FIG. 5A, the IoT device may use a sub-band of about 1.4 MHz for example.

In this case, an area of the subband in which the IoT device operates may be positioned in a central region (e.g., six middle PRBs) of the system bandwidth of the cell as shown in FIG. 5A.

Alternatively, as shown in FIG. 5B, a plurality of sub-bands of the IoT device may be used in one subframe for intra-subframe multiplexing between IoT devices to use different sub-bands between IoT devices. In this case, the majority of IoT devices may use sub-bands other than the central region of the system band of the cell (e.g., six middle PRBs).

The IoT communication operating on such a reduced bandwidth can be called NB (Narrow Band) IoT communication or NB CIoT communication.

Figure 6:
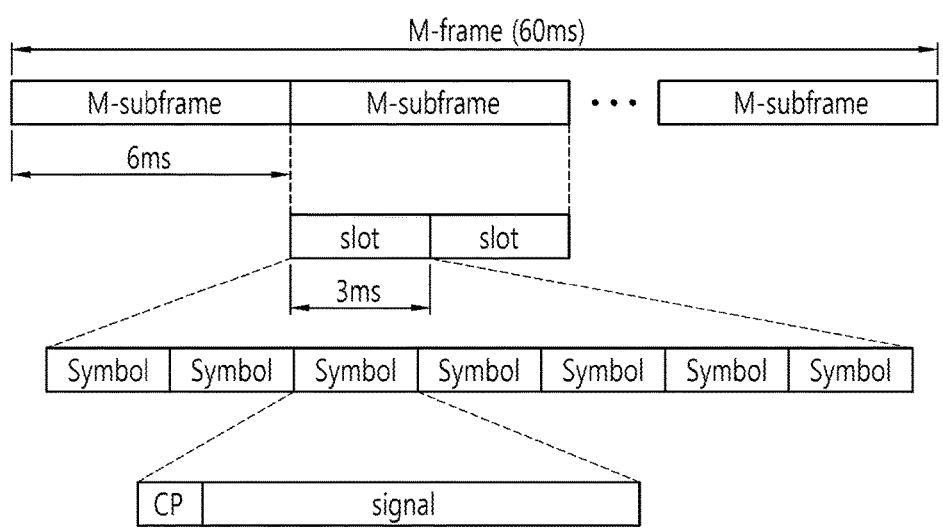
FIG. 6 illustrates an example of time resources that can be used for NB-IoT in M-frame units.

FIG. 6 Illustrates an Example of Time Resources that can be Used for NB-IoT in M-Frame Units.

Referring to FIG. 6, a frame that may be used for the NB-IoT may be referred to as an M-frame, and the length may be illustratively 60 ms. Also, a subframe that may be used for the NB IoT may be referred to as an M-subframe, and the length may be illustratively 6 ms. Thus, an M-frame may include 10 M-subframes.

Each M-subframe may include two slots, and each slot may be illustratively 3 ms.

However, unlike what is shown in FIG. 6, a slot that may be used for the NB IoT may have a length of 2 ms, and thus the subframe has a length of 4 ms and the frame may have a length of 40 ms. This will be described in more detail with reference to FIG. 7.

Figure 7:
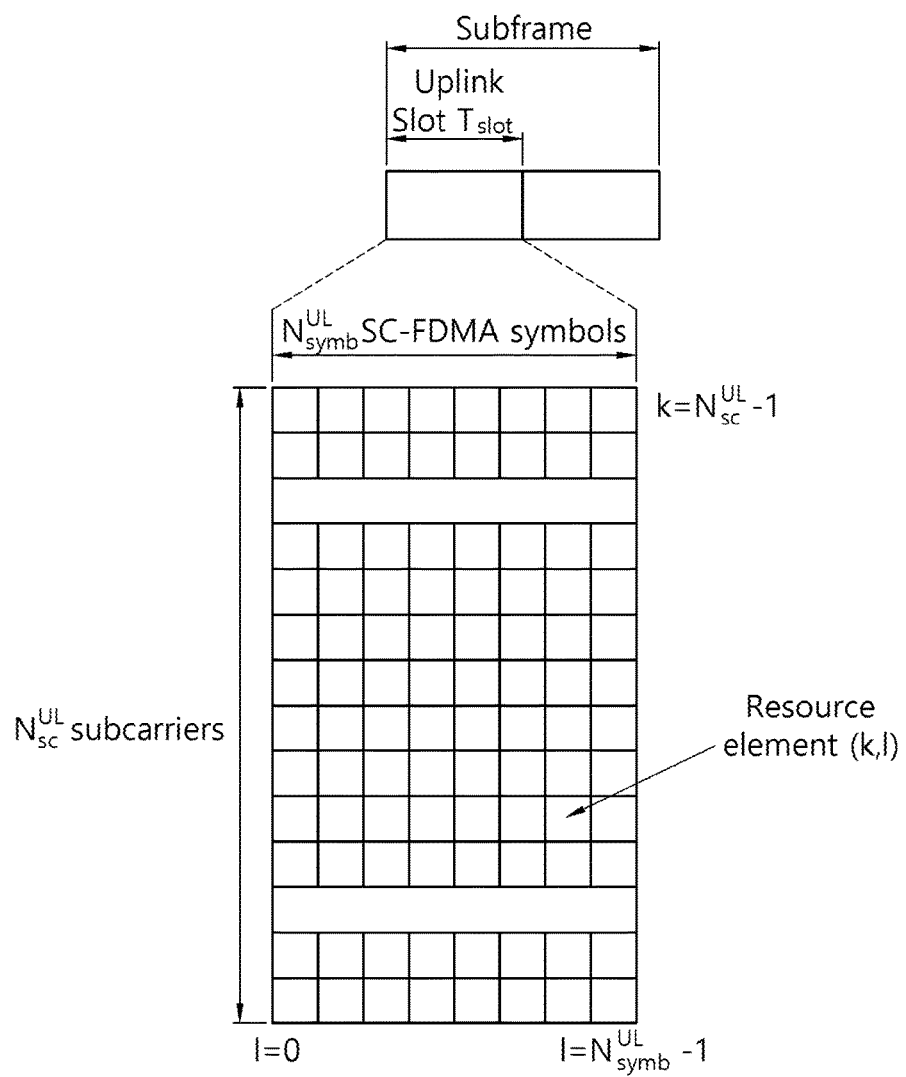
FIG. 7 is another illustration representing time resources and frequency resources that can be used for NB IoT.

FIG. 7 is another illustration representing time resources and frequency resources that can be used for NB IoT.

Referring to FIG. 7, a physical channel or physical signal transmitted on a slot from an uplink of NB-IoT includes $N_{symb}^{UL}$ SC-FDMA symbols in the time domain and $N_{SC}^{UL}$ subcarriers in the frequency domain. The uplink physical channel may be divided into a Narrowband Physical Uplink Shared Channel (NPUSCH) and a Narrowband Physical Random Access Channel (NPRACH). And a physical signal in the NB-IoT may become a Narrowband DeModulation Reference Signal (NDMRS).

The uplink bandwidths of $N_{SC}^{UL}$ subcarriers during $T_{slot}$ slots in the NB-IoT are as follows.

TABLE 3

| Subcarrier spacing | $N_{SC}^{UL}$ | $T_{slot}$ |
|---|---|---|
| Δf = 3.75 kHz | 48 | 61440 * Ts |
| Δf = 15 kHz | 12 | 15360 * Ts |

In the NB-IoT, each resource element (RE) of a resource grid may be defined by an index pair (k,l) within a slot, where k=0, . . . , $N_{SC}^{UL}-1$, and l=0, . . . , $N_{symb}^{UL}-1$, specifying an index in the time and frequency domain, respectively.

In the NB-IoT, a downlink physical channel includes a Narrowband Physical Downlink Shared Channel (NPDSCH), Narrowband Physical Broadcast Channel (NPBCH), and Narrowband Physical Downlink Control Channel (NPDCCH). And a downlink physical signal includes a Narrowband reference signal (NRS), Narrowband synchronization signal (NSS), and Narrowband positioning reference signal (NPRS). The NSS includes a Narrowband primary synchronization signal (NPSS) and a Narrowband secondary synchronization signal (NSSS).

NB-IoT is a communication method for a wireless device using a reduced bandwidth (i.e., a narrowband) according to low complexity and low cost. NB-IoT communication is aimed at enabling a large number of wireless devices to be connected in the reduced bandwidth. Further, NB-IoT communication is aimed at supporting wider cell coverage than that in existing LTE communication.

Meanwhile, as may be known from Table 1, when sub-carrier spacing is 15 kHz, a carrier having the reduced bandwidth includes only one PRB. In other words, NB-IoT communication may be performed by using only one PRB. Here, a wireless device assumes that NPSSNSSS/NPBCH/SIB-NB is transmitted from a base station, where a PRB connected to receive the NPSS/NSSS/NPBCH/SIB-NB may be called an anchor PRB (or anchor carrier). Meanwhile, in addition to the anchor PRB (or anchor carrier), the wireless device may receive additional PRBs from the base station. Here, among the additional PRBs, those PRBs not expected to receive the NPSS/NSSS/NPBCH/SIB-NB from the base station may be called a non-anchor PRB (or non-anchor carrier).

<Next-Generation Mobile Communication Network>

Due to the success of the long term evolution (LTE)/LTE-Advanced (LTE-A) for the fourth-generation mobile communication, a public interest in the next-generation (so-called 5G) mobile communication is growing, and researches into the next-generation mobile communication are conducted one after another.

The 5-th generation mobile communication, as defined by the International Telecommunication Union (ITU), refers to the technology aimed to provide a data transfer speed of up to 20 Gbps and an effective transfer speed faster than at least 100 Mbps everywhere. The official name of the 5-th generation mobile communication is 'IMT-2020', which is due to be commercialized by 2020 worldwide.

The ITU proposed three use case scenarios: enhanced Mobile BroadBand (eMBB), massive Machine Type Communication (mMTC), Ultra Reliable and Low Latency Communication (URLLC).

URLLC is related to a use scenario which requires high reliability and low latency. For example, such services as automated driving, factory automation, and augmented reality require high reliability and low latency (for example, latency less than 1 ms). The latency of the current 4G (LTE) technology is statistically 21-43 ms (best 10%) and 33-75 ms (median). This specification is not sufficient to support services requiring latency less than 1 ms. The eMBB described next is related to a use scenario requiring a mobile ultra-wideband.

In other words, the 5-th generation mobile communication system targets to provide a capacity higher than that of the current 4G LTE, improve density of mobile broadband users, and support high reliability and Machine Type Communication (MTC). 5G R&Ds also target lower latency and lower battery consumption than provided by the 4G mobile communication system to implement the Internet of things more efficiently. To realize the 5G mobile communication as described above, a new radio access technology (New RAT or NR) may be proposed.

In the NR, it may be taken into consideration that reception from a base station may use downlink subframes, and transmission to the base station may use uplink subframes. This scheme may be applied to paired spectra and unpaired spectra. One pair of spectra indicates that two carrier spectra are involved for downlink and uplink operations. For example, in one pair of spectra, one carrier may include a downlink and uplink bands forming a pair with each other.

Figure 8:
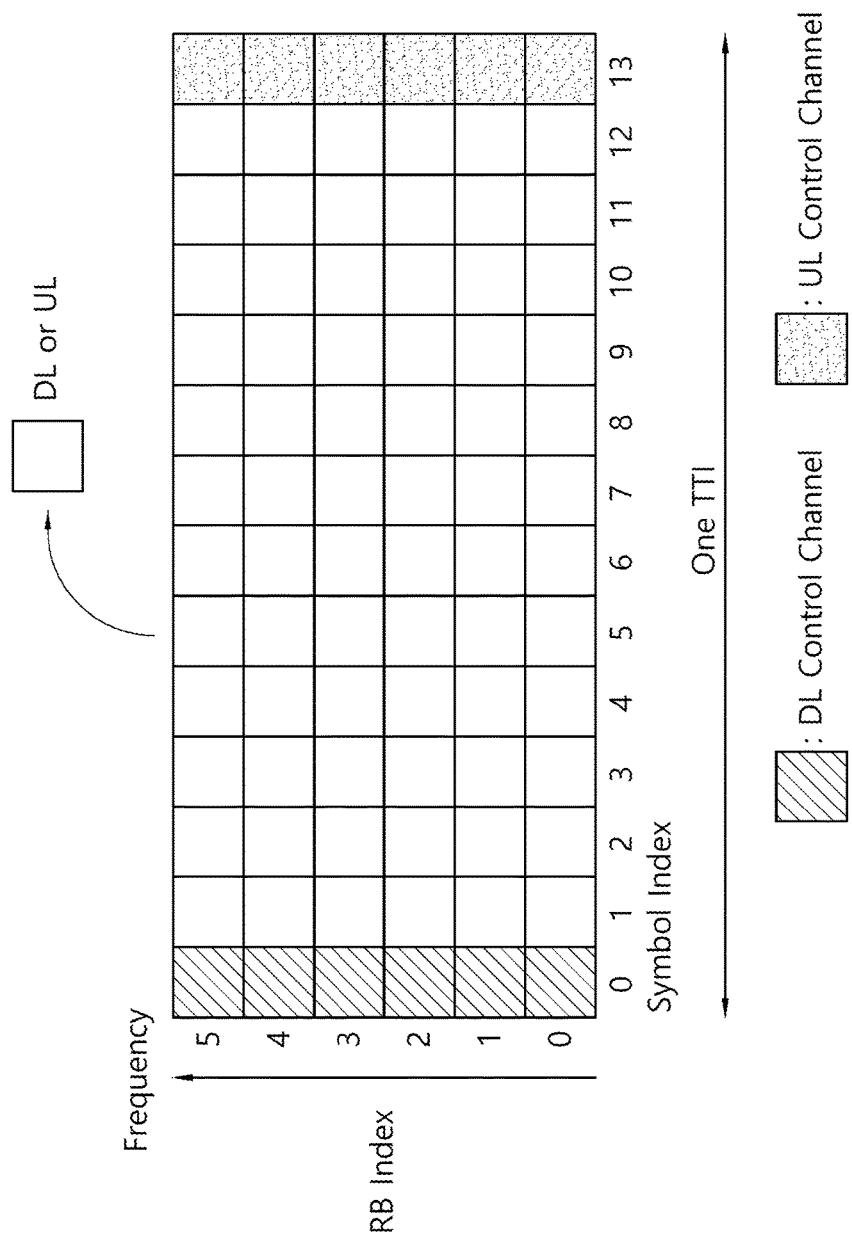
FIG. 8 illustrates an example of subframe type in the NR.

FIG. 8 Illustrates an Example of Subframe Type in the NR.

The transmission time interval (TTI) shown in FIG. 8 may be called a subframe or a slot for the NR (or new RAT). The subframe (or slot) of FIG. 8 may be used in the TDD system of NR (or new RAT) to minimize data transfer latency. As shown in FIG. 8, a subframe (or slot) comprises 14 symbols in the same way as the current subframe. The leading symbol of a subframe (or slot) may be used for DL control channel, and the trailing symbol of the subframe (or slot) may be used for UL control channel. The remaining symbols may be used for DL data transmission or UL data transmission. According to the aforementioned subframe (or slot) structure, downlink transmission and uplink transmission may be carried out sequentially in one subframe (or slot). Therefore, downlink data may be received within the subframe (or slot), or an uplink acknowledgement response (ACK/NACK) may also be transmitted within the subframe (or slot). The structure of the subframe (or slot) as described above may be referred to as a self-contained subframe (or slot). When this subframe (or slot) structure is used, time required to retransmit data which has caused a reception error is reduced, leading to minimization of final data transmission waiting time. In the self-contained subframe (or slot) structure, however, a time gap may be needed for a transitioning process from a transmission mode to a reception more or vice versa. To this end, part of OFDM symbols employed for transitioning from DL to UL transmission in the subframe structure may be designated as a guard period (GP).

<Support of Various Numerologies>

In the next-generation system, according to the advances in the wireless communication technology, a plurality of numerologies may be provided for a UE.

The numerology may be defined by the length of cyclic prefix (CP) and subcarrier spacing. A single cell may provide a plurality of numerologies to a UE. If the index of numerology is represented by μ, each subcarrier spacing and the corresponding CP length may be given as follows.

TABLE 4

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of normal CP, if the numerology index is represented by μ, the number of OFDM symbols per slot ($N_{symb}^{slot}$), the number of slots per frame ($N_{slot}^{frame,\mu}$), and the number of slots per subframe ($N_{slot}^{subframe,\mu}$) are given as follows.

TABLE 5

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of extended CP, if the numerology index is represented by μ, the number of OFDM symbols per slot ($N_{symb}^{slot}$), the number of slots per frame ($N_{slot}^{frame,\mu}$), and the number of slots per subframe ($N_{slot}^{subframe,\mu}$) are given as follows.

TABLE 6

| μ | $N_{symb}^{slot}$ | $N_{slot}^{frame,\mu}$ | $N_{slot}^{subframe,\mu}$ |
|---|---|---|---|
| 2 | 12 | 40 | 4 |

} 12? 40? 4?

Meanwhile, in the next-generation mobile communication, each symbol within a slot may be used as a downlink or an uplink as shown in the table below. In the table below, the uplink is denoted by U while the downlink is denoted by D. In the table below, X represents a symbol which may be used flexibly as an uplink or a downlink.

TABLE 7

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | U | U | U | U |
| 26 | D | D | X | X | X | X | X | X | X | X | U | U | U | U |
| 27 | D | D | D | X | X | X | X | X | X | X | U | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | X | X | X | U | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | D | D | D | D | D | D | D | X |
| 47 | D | D | D | D | X | D | D | D | D | D | D | D | X | X |
| 48 | D | D | X | X | X | X | D | D | X | X | X | X | X | X |
| 49 | D | X | X | X | X | X | X | D | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | X | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | U | U | U |
| 61 | D | D | X | X | X | U | D | D | X | X | X | U | U | U |

<Disclosure of the Present Specification>

The present specification proposes methods for transmitting a downlink channel to a Narrow band Internet of Things (NB-IoT) device on a special subframe.

NB-IoT may operate in one of the following three operation modes. The three operation modes may include a guard-band operation mode, stand-alone operation mode, and in-band operation mode. After setting the operation mode, the base station transmits an upper layer signal through, for example, a Master Information Block (MIB) or a System Information Block (SIB) to a UE (for example, an NB-IoT device).

The in-band operation mode refers to a mode where an NB-IoT cell operates in part of a band in which a first LTE cell operates. The in-band operation mode is further divided into an in-band same PCI mode (inband-samePCI) where the NB-IoT cell and the LTE cell share the same physical cell ID (hereinafter, it is also called a PCI) and an in-band different PCI mode (inband-DifferentPCI) where the NB-IoT cell and the LTE cell use different PCIs.

In the in-band same PCI mode, the number of NRSs is the same as the number of CRSs.

The guard-band operation mode refers to a mode where part of the LTE band is designated as a guard band, and the NB-IoT cell uses the guard band not used by the LTE cell. For example, the NB-IoT cell may operate one a guard band existing between a first band where a first LTE cell operates and a second band where a second LTE cell operates.

The stand-alone operation mode refers to a mode where the NB-IoT cell operates on a band where a non-LTE cell operates. For example, the NB-IoT cell may operate in part of a band where a GSM cell operates.

I. First Disclosure

The first disclosure of the present specification proposes methods for performing symbol-level combining among transmission units and cross subframe channel estimation when repetition is applied to the transmission unit. More specifically, the first disclosure of the present specification proposes a method for transmitting a downlink physical channel in slot units to support Narrowband Internet of Things (NB-IoT) operating under Time-Division Duplex (TDD) scheme and a method for scheduling the transmission. The first disclosure may be applied to an RE mapping method which uses interleaving when subframe level repetition is applied.

In the TDD, unlike the FDD, the numbers of available uplink and downlink subframes may be limited by the UL/DL configuration. Also, a sufficient number of subframes may be needed to take into account massive connectivity and to support a larger number of repetitions. More specifically, in the TDD, part of a special subframe, for example, DwPTS may be used as a downlink. At this time, the size of a DwPTS ranges from a minimum of three symbols to a maximum of 12 symbols and is composed of REs the size of which is smaller than that of REs constituting a subframe. Also, in the case of a cell using the LTE, a first to third symbols of each subframe are designed to be used as a control channel, the corresponding region may not be used for the purpose of NB-IoT. In the structure of NB-IoT FDD currently defined up to the 3GPP release-14, subframes are used as units for mapping of REs, composition of repetitions, and scheduling of an NPDSCH. If the FDD structure is utilized in the TDD scheme, due to the lack of REs in a DwPTS which is not sufficient to form a single subframe, utilization of a special subframe may not be appropriate. Therefore, in order for NB-IoT to support the TDD structure, a method for utilizing a DwPTS region of a special subframe in an efficient manner may be needed.

The first disclosure proposes a method for performing RE mapping, repetition, and scheduling in slot units when a downlink physical channel is transmitted by using a DwPTS region of a special subframe in a communication system supporting the TDD structure. More specifically, the proposed method may be applied when a transmission block may be composed of units, where each unit is packed with one or more symbols as in the NB-IoT, and repetition may be applied to the transmission block. In the following, although descriptions of the present section are given with respect to the NB-IoT, it should be clearly understood that the descriptions may also be applied to a general communication technology where a transmission block is packed with one or more symbols and comprises a resource unit in the slot size. Also, although the descriptions of the present section are given in terms of slots for the sake of convenience, it should be clearly understood that the same method may be applied to the case using resource units of a different structure formed by one or more symbols (for example, subframe).

I-1. Condition for Using DwPTS for Data Transmission

The present section proposes a method for determining a condition for using a DwPTS region of a special subframe for data transmission.

I-1-1. When the Number of Symbols Excluding a Control Format Indicator (CFI) Region of a DwPTS is X or Larger, the DwPTS Region of a Special Subframe May be Used as One Slot.

A. The size of the X may be 7.

More specifically, the condition above indicates that in the case of special subframe configurations #1, #2, #3, #4, #6, #7, and #8, the DwPTS region may be used as a slot capable of data transmission.

More specifically, the condition above indicates that in the case of special subframe configurations #0, #5, and #9, the DwPTS region is not used as a slot capable of data transmission.

B. The size of the X may be 6.

More specifically, the condition above indicates that in the case of special subframe configurations #1, #2, #3, #4, #6, #7, and #8, the DwPTS region may be used as a slot capable of data transmission.

More specifically, the condition above indicates that in the case of special subframe configurations #0 and #5, the DwPTS region is not used as a slot capable of data transmission.

More specifically, the condition above indicates that the special subframe configuration is #9, and the operation mode is guard-band or stand-alone, the DwPTS region may be used as a slot capable of data transmission.

The operation mode represents any one of guard-band, stand-alone, and in-band. The operation mode is received from a base station through higher layer signaling, for example, through a Master Information Block (MIB) or System Information Block (SIB).

The in-band operation mode refers to a mode where an NB-IoT cell operates in part of a band in which a first LTE cell operates. The in-band operation mode is further divided into an in-band same PCI mode (inband-samePCI) where the NB-IoT cell and the LTE cell share the same physical cell ID (hereinafter, it is also called a PCI) and an in-band different PCI mode (inband-DifferentPCI) where the NB-IoT cell and the LTE cell use different PCIs.

In the in-band same PCI mode, the number of NRSs is the same as the number of CRSs.

The guard-band operation mode refers to a mode where part of the LTE band is designated as a guard band, and the NB-IoT cell uses the guard band not used by the LTE cell. For example, the NB-IoT cell may operate one a guard band existing between a first band where a first LTE cell operates and a second band where a second LTE cell operates.

The stand-alone operation mode refers to a mode where the NB-IoT cell operates on a band where a non-LTE cell operates. For example, the NB-IoT cell may operate in part of a band where a GSM cell operates.

More specifically, the condition above indicates that when the special subframe configuration is #9, and the operation mode is the in-band operation mode, the DwPTS region is not used as a slot capable of data transmission.

C. According to the size of the X, handling of a DwPTS as a resource unit may be different.

For example, when $X \leq X_{symbol}$, a DwPTS may be handled as a symbol or a region incapable of data transmission while, when $X_{symbol} < X \leq X_{slot}$, the DwPTS is handled as a slot, and when $X_{slot} < X$, the DwPTS may be handled as a subframe.

D. The size of the X may be different according to the size of Control Format Indicator (CFI).

The condition proposed above may be intended to guarantee the size of at least one slot when a DwPTS is used for data transmission. For example, since in the case of special subframe configurations #0 and #5, the number of available symbols is 3 symbols at maximum, it may not be appropriate to compose one slot. In the case of a special subframe configuration #9, if CFI=0, the number of available symbols is 6, and one symbol may be used as being punctured in one slot.

If the DwPTS is used for data transmission, and the DwPTS is used for scheduling in units of subframes, part of symbols may be punctured according to the number of available symbols. In the case of transmission where repetition is not applied (or where the repetition level is below a specific threshold), instead of puncturing part of symbols, rate matching may be performed in proportion to the number of REs available in the DwPTS region.

I-1-2. The Base Station May Determine Whether a DwPTS Region of a Special Subframe is Used as One Slot and May Inform a UE of the Corresponding Information.

In the description above, the corresponding information may be indicated to a UE by using a higher-layer signal such as an SIB or an RRC signal.

At this time, the information may be configured differently for each carrier.

In the description above, the corresponding information may be indicated to a UE dynamically through DCI.

At this time, the corresponding information may be:
1 bit information which informs of its availability.
information in the form of a bitmap composed of multi-bits by which a UE informs of special subframes the DwPTS regions of which are allowed to be used.

The condition proposed above may be intended to allow a base station to control the use of the DwPTS.

The methods proposed in the Sections I-1-1 and I-1-2 may be used in combination with each other. At this time, a method proposed in the Section I-1-1 may determine an available special subframe configuration, and descriptions given in Section I-1-2 may determine whether a UE uses the DwPTS region of a special subframe as one slot.

I-1-3. The Operation Mode May Determine Whether a DwPTS Region of a Special Subframe is Used as One Slot.

A. The operation mode in which a DwPTS region of a special subframe is used as one slot may be applied only to the in-band operation mode.

B. When the operation mode is guard-band or stand-alone mode, the DwPTS region may be used a one subframe unit.

At this time, in the case of OFDM symbols which are unavailable as being allocated for the purpose of a GAP or UpPTS, the unavailable OFDM symbols may be punctured after RE mapping is performed with reference to a DL subframe rather than a special subframe.

The condition above may be applied only when the size of $M_{rep}^{NPDSCH}$, which is a unit by which an NPDSCH transmission block is repeated, is 2 or more. If $M_{rep}^{NPDSCH}=1$, RE mapping within a special subframe may be performed only for the REs available for the purpose of DL data in the DwPTS region within the special subframe.

This is so because according to the proposed condition, the number of available OFDM symbols is different for each operation mode.

I-2. NRS Configuration in the Special Subframe

When a DwPTS of a special subframe is used as one slot, the method proposed in the present section may include a method for configuring an NRS in the corresponding slot. More specifically, in the NB-IoT, the structure of an NRS has to be designed such that cross channel estimation and coherent combining are possible between slots, and one slot is repeated multiple times.

I-2-1. When a DwPTS Region of a Special Subframe is Composed of Slots Intended for Transmission of Downlink Physical Channels, the Positions of REs to which an NRS is Mapped May be Determined by the Criterion as Shown Below.

$$k = 6m + (v + v_{shift}) \bmod 6$$

$$l = N_{symb}^{DL} - 4, N_{symb}^{DL} - 3, N_{symb}^{DL}$$

$$m = 0, 1$$

$$m' = m + N_{RB}^{max,DL} - 1 \quad [\text{Eq. 1}]$$

Mapping of an NRS employing the equation above may be applied only to the region of a first slot within a special subframe.

In the equation above, l may have only limited values. In the equation above, $N_{symb}^{DL}$ represents the number of OFDM symbols existing within one slot. When the number of OFDM symbols within a slot is 7, l may have one or more values among 3, 4, and 7. At this time, the NRS may be transmitted from the third, fourth, and seventh OFDM symbol within the slot. This is so intended to exclude symbols other than the first and second symbols which may be used as a control region (namely, transmission region of a PDCCH) from the corresponding special subframe. Similarly, when the number of OFDM symbols existing within a slot is 6, l may have one or more values among 2, 3, and 6. At this time, the NRS may be transmitted from the second, third, and sixth OFDM symbol within the slot. Likewise, when the number of OFDM symbols existing within a slot is 5, l may be 1, 2, or 5.

In the equation above, k represents the index of one PRB on the frequency domain, and l represents the index of one slot on the time domain. In the equation above, $v_{shift}$ value is a cell-specific frequency shift value, which may be determined by the equation $v_{shift} = N_{ID}^{Ncell} \bmod 6$.

In the equation above, v may be determined by one of the following criteria. At this time, p represents the index of an antenna port through which an NRS is transmitted.

$$v = \begin{cases} 0 & \text{if } p = 2000 \text{ and } l = N_{symb}^{DL} - 4, N_{symb}^{DL} \\ 3 & \text{if } p = 2000 \text{ and } l = N_{symb}^{DL} - 3 \\ 3 & \text{if } p = 2001 \text{ and } l = N_{symb}^{DL} - 4, N_{symb}^{DL} \\ 0 & \text{if } p = 2001 \text{ and } l = N_{symb}^{DL} - 3 \end{cases} \quad [\text{Eq. 2}]$$

or

-continued $$v = \begin{cases} 0 & \text{if } p = 2000 \text{ and } l = N_{symb}^{DL} - 4 \\ 3 & \text{if } p = 2000 \text{ and } l = N_{symb}^{DL} - 3, N_{symb}^{DL} \\ 3 & \text{if } p = 2001 \text{ and } l = N_{symb}^{DL} - 4 \\ 0 & \text{if } p = 2001 \text{ and } l = N_{symb}^{DL} - 3, N_{symb}^{DL} \end{cases}$$

Figure 9:
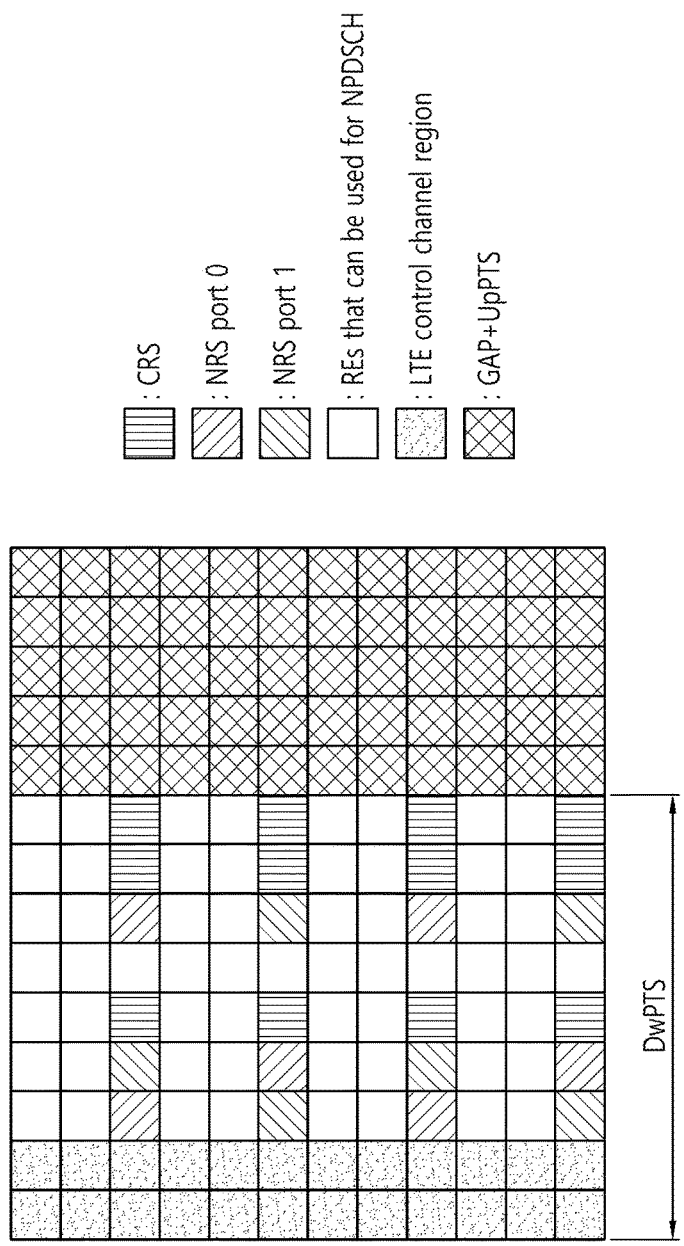
FIG. 9 illustrates one example of mapping an NRS according to a method of Section I-2-1.

FIG. 9 Illustrates One Example of Mapping an NRS According to a Method of Section I-2-1.

When the NRS mapping method for a special subframe is different depending on the operation mode, the method proposed in Section I-2-1 may be applied to the in-band operation mode. At this time, in the guard-band or stand-alone operation mode, an NRS mapping method for a DL subframe may be used rather than the NRS mapping method for a special subframe.

In the method of Section I-2-1, when the operation mode is in-band, the criterion according to which an NRS is mapped may be introduced to take into account the position of an OFDM symbol which may be unavailable in a special subframe due to the CFI. Also, the criterion may be introduced to minimize additional puncturing during the process of RE mapping taking into account coherent combining by reusing the positions of REs punctured for the purposes of a CRS and NRS in a slot included in a DL subframe different from the special subframe as the position of the NRS newly defined in the special subframe. A detailed description of RE mapping taking into account the coherent mapping may be given in Section I-3-3 to be followed.

I-2-2. When a DwPTS Region of a Special Subframe is Composed of Slots Intended for Transmission of Downlink Physical Channels, the Positions of REs to which an NRS is Mapped May be Determined in the Same Manner as in a DL Subframe.

At this time, it may be determined so that an NRS is not transmitted to an OFDM symbol not included in a DwPTS.

I-3. Mapping to RE

When a DwPTS of a special subframe is used as one slot, a method for composing a transmission block of NB-IoT taking into account transmission in units of existing subframes may be inappropriate. When a DwPTS region of a special subframe is used for data transmission, in order to consider and use the DwPTS region as one slot, the present section may further include a method for mapping data symbols to resource elements (REs) when a downlink physical channel is transmitted. The descriptions given below are based on an NPDSCH for the sake of convenience; however, the descriptions may also be applied to other downlink physical channel for which one or more symbols are gathered to form one transmission block.

I-3-1) In the TDD, a Slot is Defined as the Minimum Transmission Unit of an NPDSCH. At this Time, One NPDSCH Transmission Block May be Mapped to $N_{slot}$ Slots and Transmitted Repeatedly $M_{rep}^{NPDSCH}$ Times.

A. REs not used for the purpose of a CRS and NRS with reference to the second slot of a downlink subframe rather than a special subframe may be determined as REs used for transmission of an NPDSCH.

At this time, if an RE designated as available for transmission of an NPDSCH according to the criterion above in a specific slot becomes unavailable, the corresponding RE may be punctured.

At this time, even if an RE designated as unavailable for transmission of an NPDSCH according to the criterion in a specific slot is not used for the purpose of a CRS or NRS, the corresponding RE may be determined not to be used for transmission of an NPDSCH.

The method for determining REs used for transmission of an NRS may be applied only to the case where the number of repetitions of an NPDSCH transmission block $M_{rep}^{NPDSCH}$ is 2 or more. If $M_{rep}^{NPDSCH}=1$, REs used for transmission of an NPDSCH may not be used for the purpose of a CRS and NRS for each slot or may be determined to be used only for the case where the REs are reserved to be used by other system (for example, a control channel).

Figure 10:
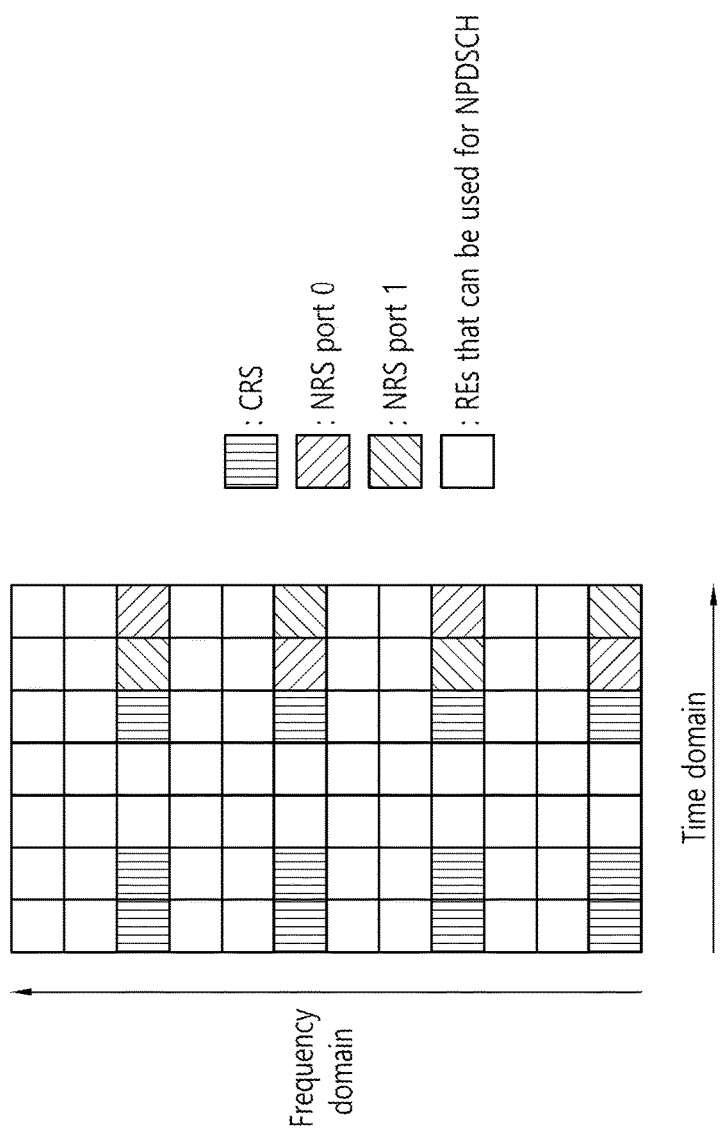
FIG. 10 illustrates the positions of available REs according to a method of Section I-3-1.

FIG. 10 Illustrates the Positions of Available REs According to a Method of Section I-3-1.

In FIG. 10, the positions of REs on the frequency domain may be different according to the ID of a cell.

B. In order to determine $N_{slot}$, resource allocation information of an NPDSCH designated through DCI may be expressed in slot units.

At this time, $N_{slot}$ may be determined by $I_{SF}$ which is the information of a resource assignment (RA) field defined in the DCI. The table below illustrates one example of determining $N_{slot}$ through $I_{SF}$. In other words, the table below shows the number of slots $N_{slot}$ for an NPDSCH in the case of TDD.

TABLE 8

| $I_{SF}$ | $N_{slot}$ |
|---|---|
| 0 | 2 |
| 1 | 4 |
| 2 | 6 |
| 3 | 8 |
| 4 | 10 |
| 5 | 12 |
| 6 | 16 |
| 7 | 20 |

At this time, $N_{slot}$ may be determined by a combination of information of the resource assignment (RA) field defined in the DCI, $I_{SF}$, and information of transmission block size (TBS), $I_{TBS}$. For example, the number of available slots $N_{slot,1}$ may be designated through $I_{SF}$, and it may be determined that $N_{slot}=N_{slot,1}-1$ when $I_{TBS} \leq k$ for a specific threshold k while it may be determined that $N_{slot}=N_{slot,1}$ when $I_{TBS}>k$.

C. When repetition is applied, a criterion for applying the repetition may be configured in slot units.

At this time, when a complex-valued symbol constituting one NPDSCH transmission block transmitted through an antenna port p is $y^{(p)}(0), \ldots, y^{(p)}(M_{symb}^{ap}-1)$, the corresponding symbols are mapped to the REs within a slot in the ascending order, the symbols starting from $y^{(p)}(0)$. Specifics of the method may be performed according to the following order.

(1) If mapping of a complex-valued symbol is completed up to the last RE of one slot, before the next complex-valued symbol is mapped, the corresponding slot may be repeated at $\min(M_{rep}^{NPDSCH}, R_m)-1$ additional slots.

(2) if there still exist unmapped complex-valued symbols after the step (1) is completed, the step (1) is performed on the remaining complex-valued symbols in the ascending order.

(3) The steps (1) and (2) are repeated until a transmitted NPDSCH slot generates a total of $N_{slot} \times M_{rep}^{NPDSCH}$ slots.

Figure 11A:
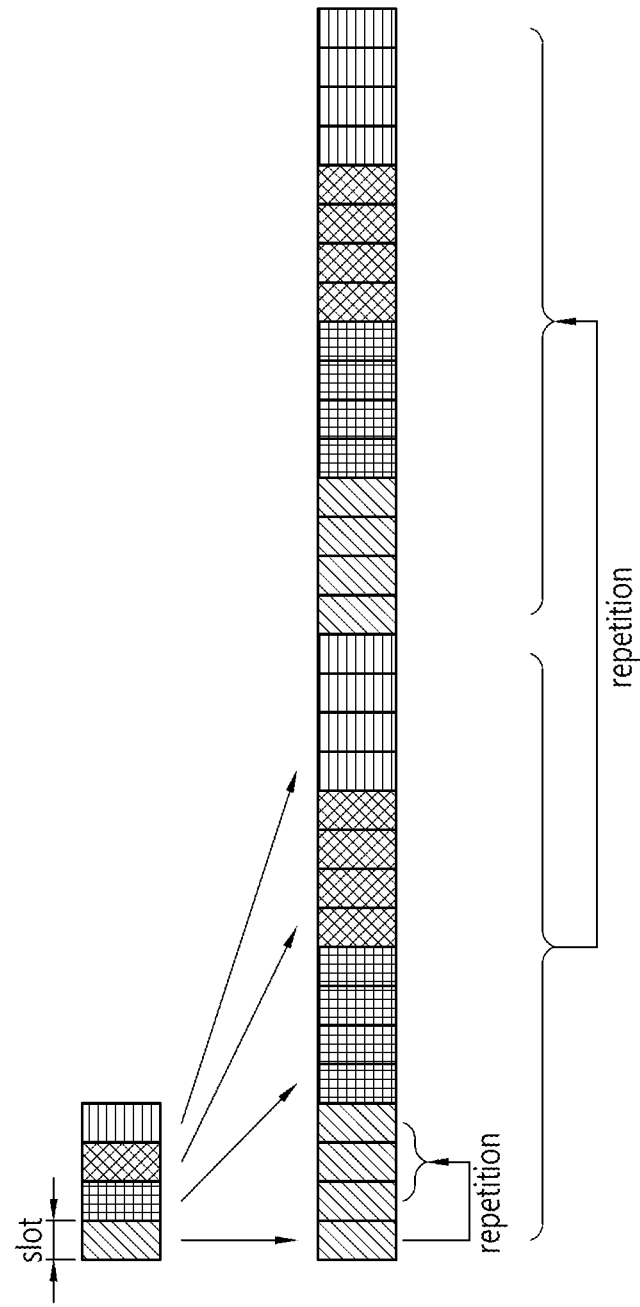
FIG. 11A illustrates an example in which a transmission block is repeated in slot units.
Figure 11B:
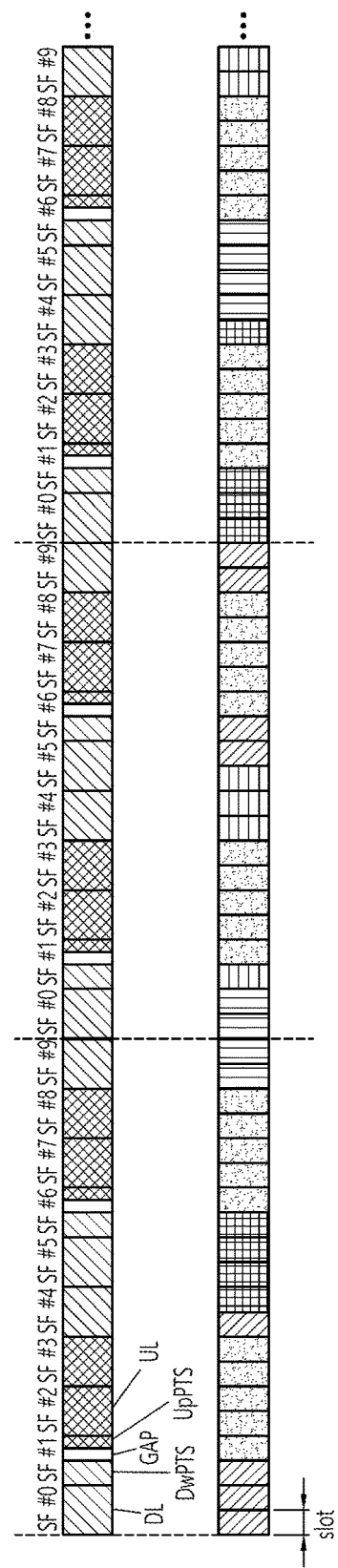
FIG. 11B illustrates a structure where each slot is actually allocated along the time axis when an uplink-downlink configuration#1 is applied, and a DwPTS region may be used as a single slot.

FIG. 11A Illustrates an Example in which a Transmission Block is Repeated in Slot Units, and FIG. 11B Illustrates a Structure where Each Slot is Actually Allocated Along the Time Axis when an Uplink-Downlink Configuration#1 is Applied, and a DwPTS Region May be Used as a Single Slot.

The example of FIG. 11A illustrates a case where the transmission block of an NPDSCH is composed of four slots, and when $R_m=4, M_{rep}^{NPDSCH}=8$, the transmission block is repeated in slot units according to the method described in Section I-3-1.

D. A different interleaving pattern may be applied to each slot.

Here, an interleaving pattern may be determined in OFDM symbol units.

Or the interleaving pattern may be determined in complex-valued symbol units.

The interleaving pattern may be initialized when NPDSCH transmission is started, and the interleaving pattern may be changed for each slot.

When the slot including the same complex-valued symbol is repeated continuously by the size of $\min(M_{rep}^{NPDSCH}, R_m)$ according to the method above, the same interleaving pattern may be used for contiguous slots satisfying the aforementioned condition.

At this time, the interleaving pattern may be initialized when NPDSCH transmission is started, and the position at which the interleaving pattern is changed may be determined as a slot appearing subsequent to a slot having a size of $\min(M_{rep}^{NPDSCH}, R_m) \times N_{slot}$ is transmitted after a new interleaving pattern is applied.

In Section I-3-1, the criterion for determining an RE used for transmission of an NPDSCH may be intended so that coherent combining of contiguous slots may be performed in an easy manner.

In Section I-3-1, the structure where a repetition rule is applied in slot units may be intended to increase the gain of the coherent combining of contiguous slots. When a repetition rule in subframe units defined in the NB-IoT FDD structure is used in the TDD scheme, the number of subframes which may employ coherent combining may be limited due to the limitation of the number of contiguous DL subframes.

In Section I-3-1, when repetition is taken into account, different interleaving may be applied to each slot in order to prevent REs punctured due to a characteristic structure of a CRS, NRS, or slot from being repeated.

In Section I-3-1, when an interleaving pattern is considered for each slot, a slot having the same complex-valued symbol applies the same interleaving pattern to the slots repeated continuously by the size of $\min(M_{rep}^{NPDSCH}, R_m)-1$ to ease the coherent combining.

I-3-2. In the TDD, the Minimum Transmission Unit of an NPDSCH is Defined as a Virtual Subframe. At this Time, One NPDSCH Transmission Block May be Mapped to $N_{SF}$ Subframes and Transmitted Repeatedly $M_{rep}^{NPDSCH}$ Times.

A. When the operation mode is in-band in the method of Section I-3-2, a virtual subframe represents a bundle of one short slot and one long slot.

At this time, a short slot represents a slot where the number of available OFDM symbols within a slot is 6 or less. For example, in a DL subframe rather than a special subframe of the LTE system, when the size of a symbol reserved to be used as a control channel is larger than 1, namely CFI>1, the first slot is not allowed to use a symbol as large as the size of CFI for the purpose of an NPDSCH, which, in this case, is defined as a short slot.

At this time, a long slot represents a slot where the number of available OFDM symbols within a slot is 7. For example, in a DL subframe rather than a special subframe of the LTE system, since the second slot may use all of the 7 symbols, the second slot is defined as a long slot.

When a DwPTS region of a special subframe is available as a slot meant for a downlink physical channel, the corresponding slot may be configured to select one between a long slot and a short slot.

A slot constituting a DwPTS region of a special subframe may be configured to have the structure of a long slot if other slot which constitutes a virtual subframe together is a short slot.

A slot constituting a DwPTS region of a special subframe may be configured to have the structure of a short slot if other slot which constitutes a virtual subframe together is a long slot.

If a DwPTS region is used as a long slot, the long slot may be configured to range from the second OFDM symbol to the ninth OFDM symbol within a special subframe.

If a DwPTS region is used as a short slot, the long slot may be configured to range from the s-th OFDM symbol to the ninth OFDM symbol within a special subframe.

At this time, s may be determined by the size of CFI in the DL subframe region rather than the special subframe.

Figure 12:
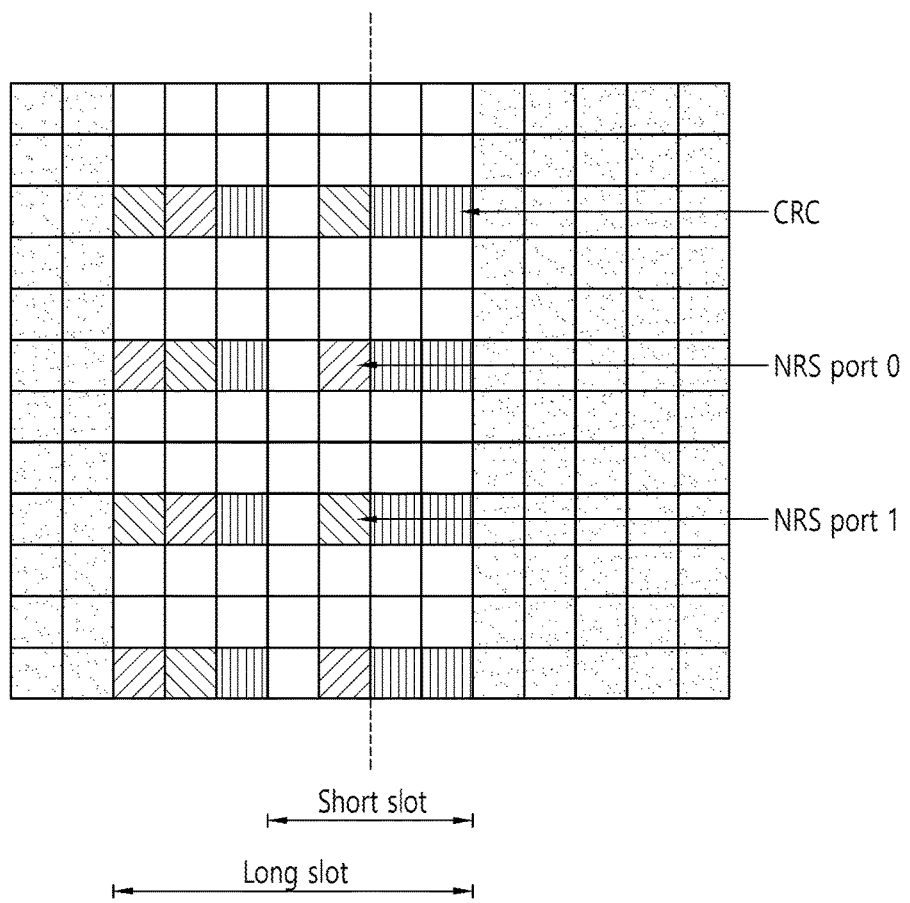
FIG. 12 illustrates an example in which a long and short slots are composed within a special subframe according to a method of Section I-3-2.

FIG. 12 Illustrates an Example in which a Long and Short Slots are Composed within a Special Subframe According to a Method of Section I-3-2.

B. When the operation mode is guard-band or stand-alone in the method of Section I-3-2, a virtual subframe represents a bundle of two long slots.

At this time, a long slot represents a slot where the number of available OFDM symbols within a slot is 7. For example, in a DL subframe rather than a special subframe of the LTE system, since the second slot may use all of the 7 symbols, the second slot is defined as a long slot.

When a DwPTS region of a special subframe is available as a slot meant for a downlink physical channel, the corresponding slot always has a structure of a long slot.

C. The REs used for transmission of an NPDSCH in the method of Section I-3-2 may be configured as being not used for the purpose of a CRS and NRS with reference to a short and long slots respectively in a downlink subframe rather than a special subframe.

At this time, if an RE configured as being available for transmission of an NPDSCH with reference to the criterion above in a specific slot becomes unavailable, the corresponding RE may be configured to be punctured.

At this time, even if an RE configured as being unavailable for transmission of an NPDSCH with reference to the criterion above in a specific slot may not be used for the purpose of a CRS or NRS, the corresponding RE may be configured not to be used for transmission of an NPDSCH.

FIG. 13 illustrates the position of an available RE according to a method of Section I-3-2.

In the example of FIG. 13, the position of an available RE on the frequency domain may differ according to the value of a cell ID. Also, the illustrated example assumes the in-band operation mode, and when the operation mode is either the guard-band or stand-alone mode, the position of a CRS may be used for the purpose of an NPDSCH.

D. In the method of Section I-3-2, two slots constituting a virtual subframe may not exist within the boundary of one subframe defined in the LTE.

At this time, the virtual subframe may be composed of two contiguous slots among slots available for the purpose of a downlink physical channel.

Figure 14A:
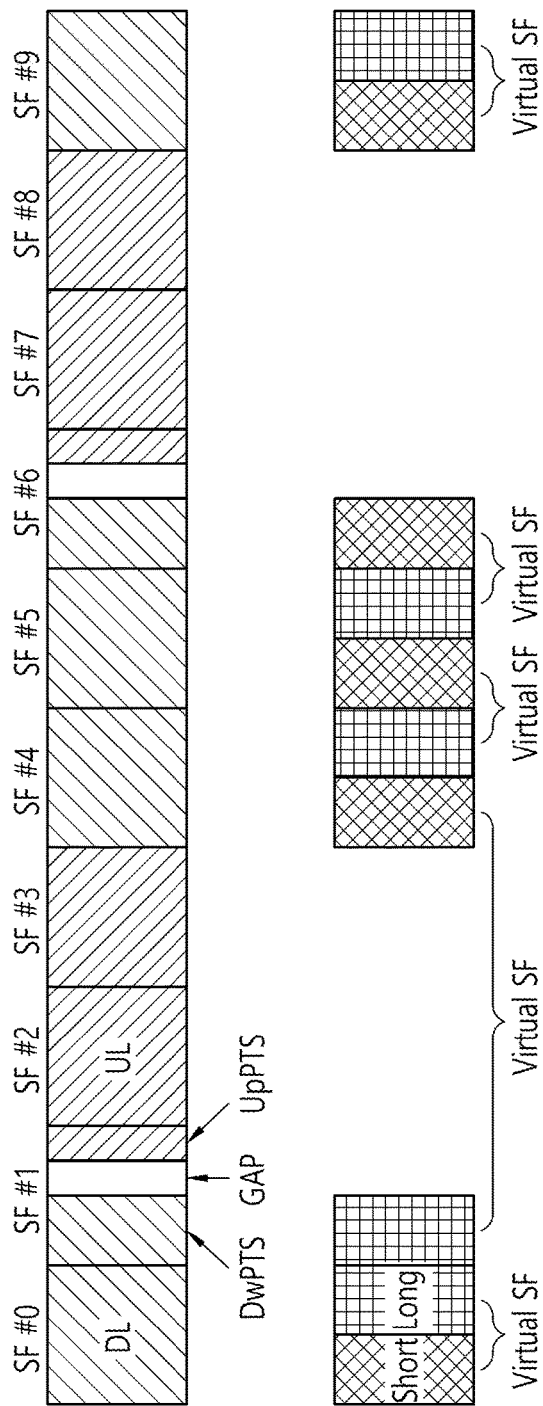
FIG. 14A illustrates an example of constructing a virtual subframe when a short and long slots are distinguished from each other according to a method of Section I-3-2.
Figure 14B:
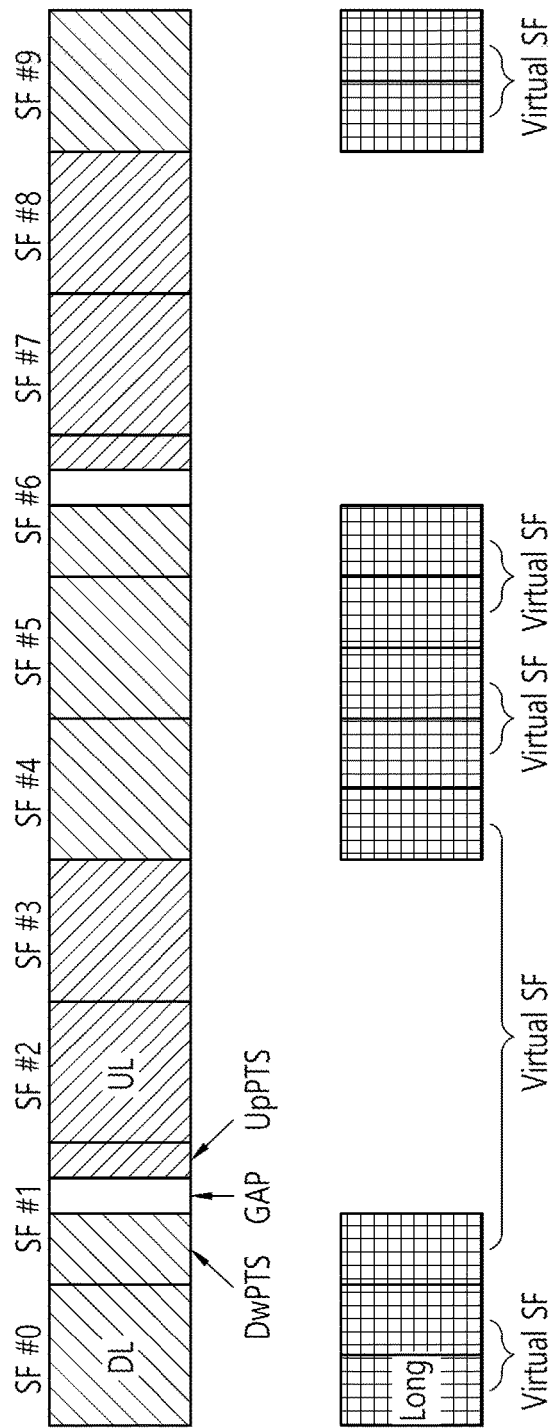
FIG. 14B illustrates an example of constructing a virtual frame when only long slots are taken into account.

FIG. 14A Illustrates an Example of Constructing a Virtual Subframe when a Short and Long Slots are Distinguished from Each Other According to a Method of Section I-3-2, and FIG. 14B Illustrates an Example of Constructing a Virtual Frame when Only Long Slots are Taken into Account.

E. If a slot is classified as a shot and a long slot in the method of Section I-3-2, a virtual subframe may be composed to support both of a sequence in the order of a short slot followed by a long slot (which, in what follows, is defined as a virtual subframe type A) and a sequence in the order of a long slot followed by a short slot (which, in what follows, is defined as a virtual subframe type B).

Different interleaving patterns may be applied to the virtual subframe type A and B.

At this time, the interleaving pattern may be performed with reference to an OFDM symbol.

At this time, the interleaving pattern may be performed with reference to a complex-valued symbol.

The interleaving pattern may be determined according to the following criterion.

When two or more different virtual subframes exist, for which repetition is applied and which map the same complex-valued symbol, and the virtual subframe types thereof are different from each other, all of complex-valued symbols need to have the same frequency domain index within the whole virtual subframes.

The purpose of taking into account a virtual subframe structure in the method of Section I-3-2 is to compose all of available slots in subframe units when a DwPTS region of a special subframe is composed of one slot.

In the method of Section I-3-2, a method for selecting a symbol index when a DwPTS region of a special subframe is composed of short slots may be intended to have the positions of used REs the same as in the structure of a short slot used in a DL subframe rather than the special subframe.

In the method of Section I-3-2, the interleaving patterns of virtual subframe types A and B may be different so that coherent combining may be applied easily.

I-3-3. In the TDD Scheme, a Subframe is Defined as the Minimum Transmission Unit for an NPDSCH. At this Time, One NPDSCH Transmission Block May be Mapped to $N_{SF}$ Subframes and Transmitted $M_{rep}^{NPDSCH}$ Times.

A. A combination of one or more methods described below may be used as a specific method for performing the method of Section I-3-3.

When the method of Section I-3-3 is used, and the number of repetitions of an NPDSCH transmission block $M_{rep}^{N-PDSCH}$ is 1, rate matching may be performed for RE mapping within a DwPTS region by taking into account the number of available REs intended for DL data.

B. When the method of Section I-3-3 is used, and the number of repetitions of an NPDSCH transmission block is such that $M_{rep}^{NPDSCH}>1$.

RE mapping within a DwPTS region is assumed to be performed based on a normal DL subframe and may use a structure which punctures OFDM symbols unavailable by being designated for the purpose of a GP or UpPTS.

When the position of a symbol reserved for the purpose of an LTE control channel in a DL subframe region may be used for the purpose of a data symbol within a DwPTS region (for example, when the CFI value in a special subframe is smaller than the CFI value in a DL subframe), one RE among OFDM symbols punctured for the purpose of a GP or UpPTS may be mapped to the corresponding position.

Figure 15:
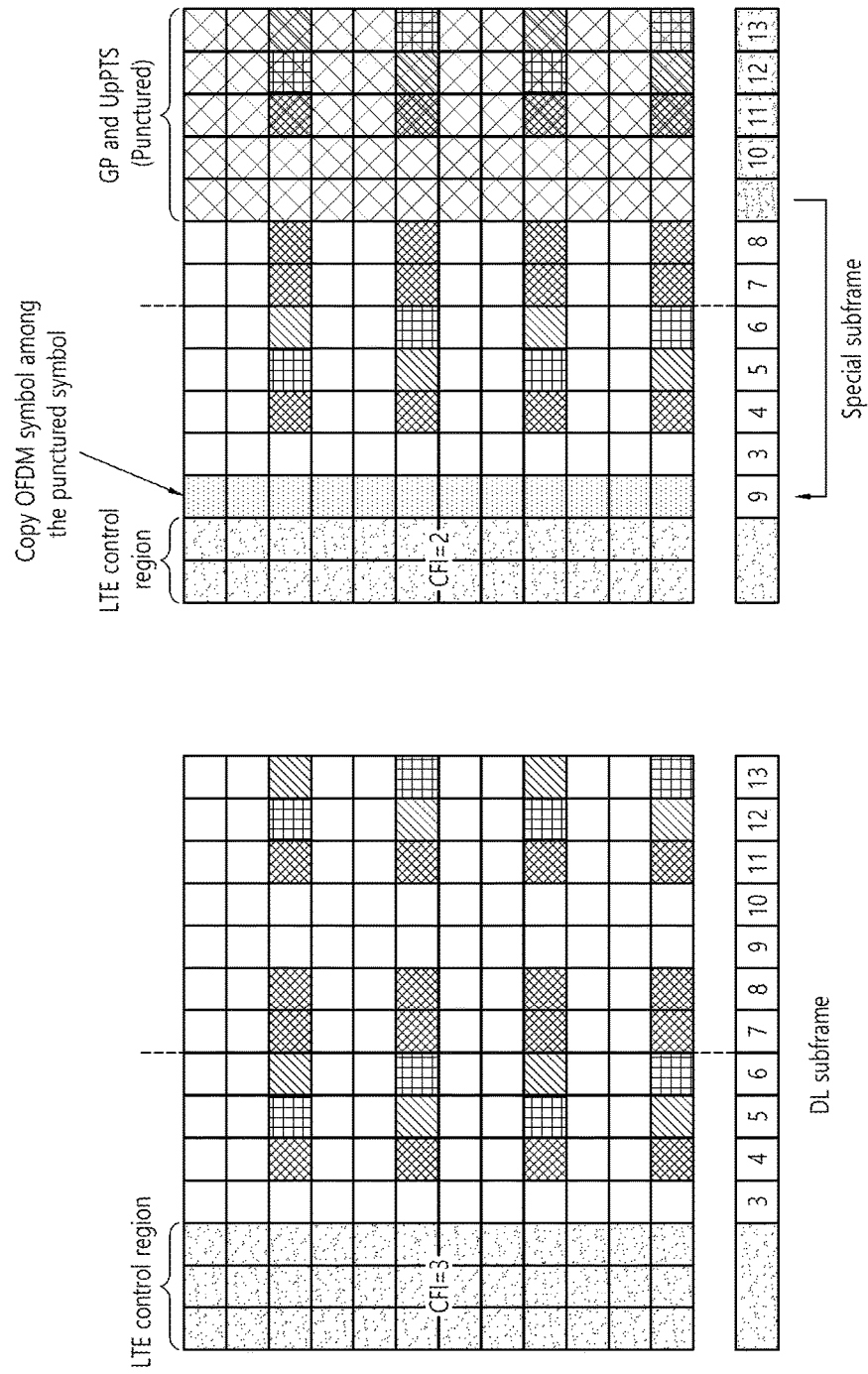
FIG. 15 illustrates a method for puncturing part of OFDM symbols for the purpose of a GP or UpPTS when RE mapping is performed in a DwPTS region while transmission of an NPDSCH is set to be applied repeatedly, and mapping the punctured symbols to the positions of OFDM symbols used within the DwPTS but not used in a DL subframe.

FIG. 15 Illustrates a Method for Puncturing Part of OFDM Symbols for the Purpose of a GP or UpPTS when RE Mapping is Performed in a DwPTS Region while Transmission of an NPDSCH is Set to be Applied Repeatedly, and Mapping the Punctured Symbols to the Positions of OFDM Symbols Used within the DwPTS but not Used in a DL Subframe.

C. The methods of Section I-3-3 may be operated irrespective of a repetition condition of an NPDSCH transmission block.

D. When the method of Section I-3-3 is used, and an NRS mapping method used in a DwPTS is different from an NRS mapping method used in a normal DL subframe, interleaving may be performed before RE mapping so that symbol-level combining with a normal DL subframe may be performed.

At this time, an interleaving pattern may be applied differently according to the number of pots used for a reference signal. For example, a table defining an interleaving pattern when the number of NRS ports is 1 is different from a table when the number of NRS ports is 2.

At this time, an interleaving pattern may be different according to a specific condition.

The specific condition may be the operation mode. This is so because while, when the operation mode is in-band, there may exist a symbol unavailable for an NB-IoT terminal depending on a value of the CFI, when the operation mode is guard band or stand-alone, the whole DwPTS region may be used.

The specific condition may be a special subframe configuration index. This is so because characteristics of a symbol to which interleaving may be applied and the number of such symbols may be different depending on a region in which a DwPTS is available.

The specific condition may be CFI values of a DL subframe and DwPTS region. This is so because characteristics of a symbol which may be used for interleaving and the number of such symbols may be different depending on a combination of CFIs of the two regions.

The specific condition may be an NRS pattern used in a DwPTS. This is so because the position of an optimized NRS may be varied according to the size of a DwPTS, and accordingly, characteristics of a symbol which may be used for interleaving and the number of such symbols may be different. As a specific example, consider a case where the positions of an NRS within a DwPTS correspond to the second and third slots, and complex-valued symbols ranging from y(l) to y(m) are mapped to the REs within the DwPTS. When y(i) is mapped to REs in the ascending order with respect to i in a DL subframe, y(i) may be mapped to REs in the descending order with respect to i in a DwPTS.

In an attempt to obtain the same effect, another method may be performed in a form of applying interleaving in OFDM symbol units, the interleaving being intended to make the structure of RE mapping of an NRS and data symbol within a DwPTS performed by the same method as in a normal DL subframe suitable for an NRS pattern within the DwPTS.

The criterion of determining an interleaving pattern may be determined by assigning a high priority to the type and position of a reference signal included in each OFDM symbol. For example, an interleaving pattern may be determined so that an OFDM symbol including a CRS in a DL subframe may correspond to an OFDM symbol index including a CRS within a DwPTS, and an OFDM symbol including an NRS in a DL subframe may correspond to an OFDM symbol index including an NRS within a DwPTS. At this time, if the same reference signals have different positions on the frequency domain, an interleaving pattern is determined so that OFDM symbols having the same positions on the frequency domain may correspond to each other.

At this time, if the number of available symbols within a DwPTS is not enough compared with a normal DL subframe, part of OFDM symbols may be punctured.

At this time, if the position of an RE used for the purpose of data transmission in a DL subframe is reserved for the purpose of RS transmission at the position designated by interleaving in a DwPTS, the corresponding REs may be used for RS transmission, and the data at the corresponding RE positions may be punctured.

At this time, the interleaving pattern may be different according to a specific condition.

The specific condition may be the operation mode. This is so because while, when the operation mode is in-band, there may exist a symbol unavailable for an NB-IoT terminal depending on a value of the CFI, when the operation mode is guard band or stand-alone, the whole DwPTS region may be used.

The specific condition may be a special subframe configuration index. This is so because characteristics of a symbol to which interleaving may be applied and the number of such symbols may be different depending on a region in which a DwPTS is available.

The specific condition may be CFI values of a DL subframe and DwPTS region. This is so because characteristics of a symbol which may be used for interleaving and the number of such symbols may be different depending on a combination of CFIs of the two regions.

The specific condition may be an NRS pattern used in a DwPTS. This is so because the position of an optimized NRS may be varied according to the size of a DwPTS, and accordingly, characteristics of a symbol which may be used for interleaving and the number of such symbols may be different.

For example, when an OFDM symbol having the q-th index during an RE mapping process is interleaved as an OFDM symbol of the q'-th index in terms of OFDM baseband signal generation, available interleaving patterns may have forms as shown in the following tables.

Table 9 below shows an interleaving pattern when the position of an NRS within a DwPTS is #2, #3, #9, and/or #10.

TABLE 9

| q' | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| q  | 0 | 3 | 5 | 6 | 4 | 9 | 10| 7 | 8 | 12| 13 | 11 | 2  | 1  |

Table 10 below shows an interleaving pattern when the position of an NRS within a DwPTS is #5, #6, #9, and/or #10.

TABLE 10

| q' | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| q  | 0 | 9 | 10| 3 | 4 | 5 | 6 | 7 | 8 | 12| 13 | 11 | 1  | 2  |

Table 11 below shows an interleaving pattern when the position of an NRS within a DwPTS is #2, #3, #5, and/or #6.

TABLE 11

| q' | 0 | 1  | 2  | 3  | 4 | 5 | 6 | 7 | 8 | 9 | 10 | 11 | 12 | 13 |
|----|---|----|----|----|---|---|---|---|---|---|----|----|----|----|
| q  | 0 | 11 | 12 | 13 | 4 | 5 | 6 | 7 | 8 | 9 | 10 | 3  | 1  | 2  |

Figure 16A:
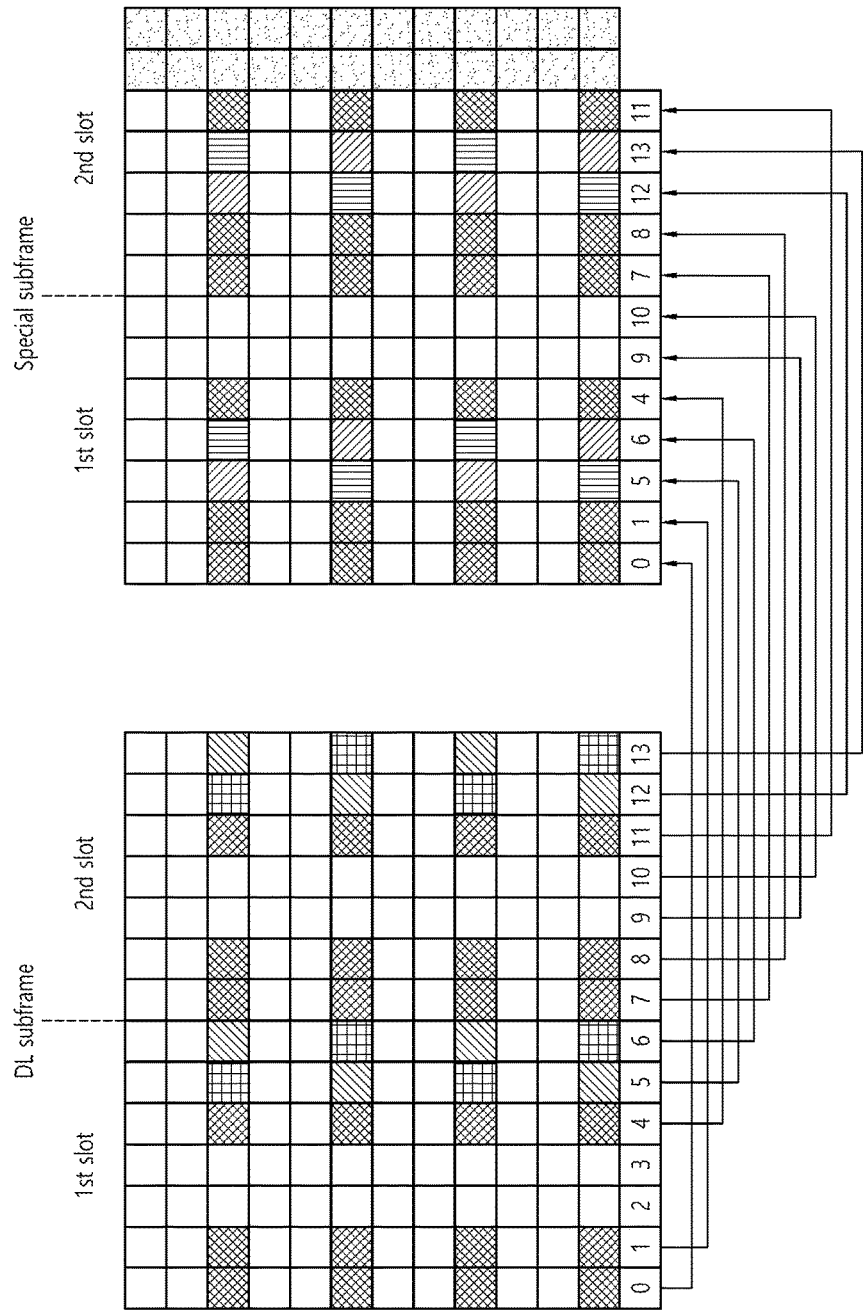
FIGS. 16A and 16B illustrate examples in which interleaving at the OFDM symbol level which takes into account the type and position of a reference signal in a DwPTS region is applied.
Figure 16B:
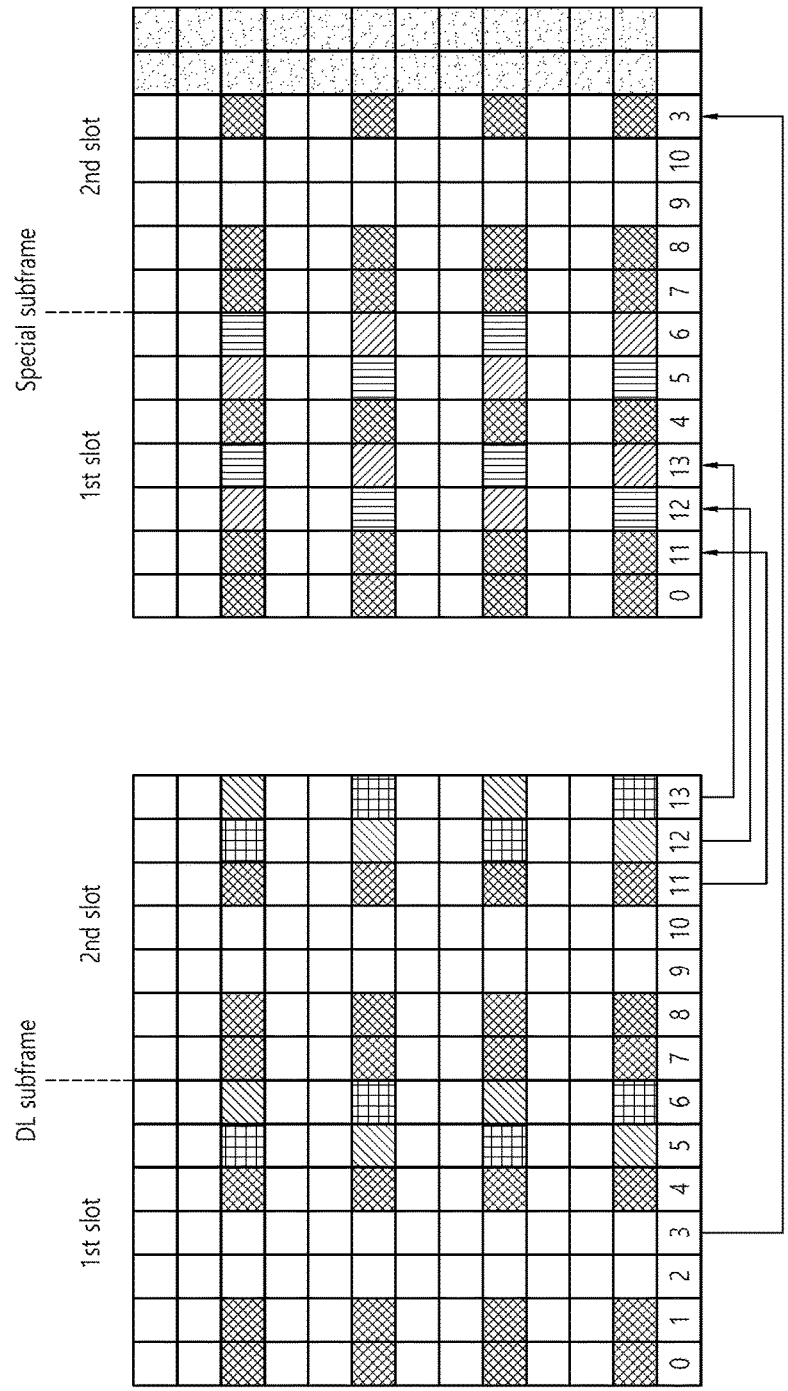

FIGS. 16A and 16B Illustrate Examples in which Interleaving at the OFDM Symbol Level which Takes into Account the Type and Position of a Reference Signal in a DwPTS Region is Applied.

When repetition is 1 in the method of Section I-3-3, RE mapping may be employed to minimize information lost due to puncturing.

When repetition is larger than 1 in the method of Section I-3-3, RE mapping may be employed to obtain a gain through symbol-level combining when a low complexity and low cost condition for a UE is taken into account. Also, the RE mapping may be employed to minimize information lost due to puncturing.

When the method of Section I-3-3 is unified into one RE mapping method irrespective of the repetition size, it may be intended to reduce decoding complexity by unifying the way that a UE interprets RE mapping.

FIGS. 17A and 17B Illustrate an Example of Performing Interleaving at the OFDM Symbol Level According to a DwPTS Interleaving Pattern by Using a Method of Section I-3-3 when the Operation Mode is in-Band; and FIGS. 18A and 18B Illustrate an Example of Performing Interleaving at the OFDM Symbol Level According to a DwPTS Interleaving Pattern by Using a Method of Section I-3-3 when the Operation Mode is Stand-Alone or Protection Mode.

As shown in the examples, interleaving patterns may be different from each other according to the position of an NRS, length of a DwPTS, and operation mode.

I-3-3-A. If Repetition is Applied to Transmission of an NPDSCH, and a Normal DL Subframe and a DwPTS are Included in the Period Over which the Repetition is Applied, a Method for Mapping Data to the DwPTS May be Different Among Different DwPTSs.

Like the method proposed in Section I-3-3, when transmission of a DwPTS is performed in such a way that an RE (or a symbol) transmitted to a normal DL subframe is repeated, this section proposes a method for determining a structure for mapping data to the DwPTS to be different among different DwPTSs. As proposed in the Section I-3-3, when data are mapped through symbol-level interleaving, an interleaving pattern to which symbol-level interleaving is applied may be made to be different for each DwPTS. More specifically, an interleaving pattern may be determined (1) by an appearing order of a DwPTS, (2) by a length over which repetition has been progressed, or (3) by an appearing order of a special subframe within a radio frame.

As a specific example for applying the proposed I-3-3-a method, if a symbol index of a DL subframe repeated at the n-th DwPTS is #a, #a+1, . . . , #a+NS, the symbol index of a DL subframe repeated at the (n+1)-th DwPTS may be #a+b, #a+b+1, . . . , #[(NS+a+b) mod ND]. At this time, Ns represents the number of available symbols within a DwPTS, ND represents the number of symbols used in a DL subframe, and a represents an arbitrary symbol index. At this time, b is a constant value for changing the interleaving pattern among DwPTSs.

I-3-4. The NRS Pattern in a DwPTS May be Different for Each Operation Mode.

A combination of one or more methods described below may be used.

A. When the operation mode is guard-band or stand-along mode, a frequency shift value which determines the position on the frequency domain to which an NRS is transmitted may be determined by applying the same method used for a normal DL subframe.

At this time, transmission of data to a DwPTS is performed by repeating REs in a data region of a normal DL subframe, where a specific method for the transmission is described below.

Part of OFDM symbols in a normal DL subframe is punctured. At this time, the index of a punctured symbol may be determined according to the size of a DwPTS, position of an NRS, or configuration index of a special subframe.

A-1. When the position of an NRS is at the third and fourth OFDM symbol within each slot; configuration index of a special subframe is #3, #4, or #8; or the number of OFDM symbols in a DwPTS region is 11 or 12, the index of a punctured OFDM symbol may include the first, second, and third OFDM symbol of the first slot.

Figure 19:
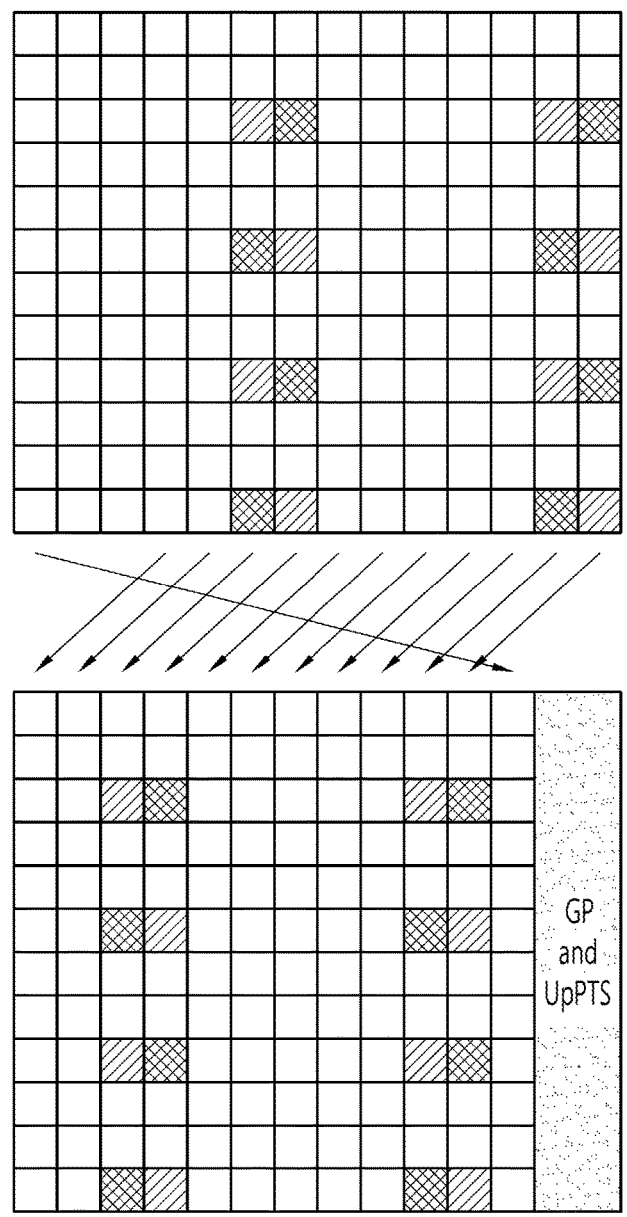
FIG. 19 illustrates an example of method A-1 proposed in Section I-3-4.

FIG. 19 Illustrates an Example of Method A-1 Proposed in Section I-3-4.

If the size of a DwPTS is 11, the three OFDM symbols are all punctured. The remaining unpunctured OFDM symbols are mapped sequentially to the OFDM symbols not used for the purpose of a GP and UpPTS in the DwPTS region.

If the size of a DwPTS is 12, only two out of the three OFDM symbols are punctured. The fourth to seventh OFDM symbols of the first slot among the remaining unpunctured OFDM symbols and the first to seventh OFDM symbols of the second slot are mapped sequentially to the OFDM symbols not used for the purpose of a GP and UpPTS in the DwPTS region. At this time, one unpunctured OFDM symbol among the first to third OFDM symbols of a normal DL subframe is mapped to the fifth OFDM symbol position of the second slot of the DwPTS.

The proposed position of a punctured symbol may be different and may be determined to be different according to the position of a DwPTS.

A-2. When the position of an NRS is at the third and fourth OFDM symbol within the first slot; configuration index of a special subframe is #9 or #10; or the number of OFDM symbols in a DwPTS region is 6, the index of a punctured OFDM symbol may include the first, second, and third OFDM symbol of the first slot; and the third to seventh OFDM symbols of the second slot.

Figure 20:
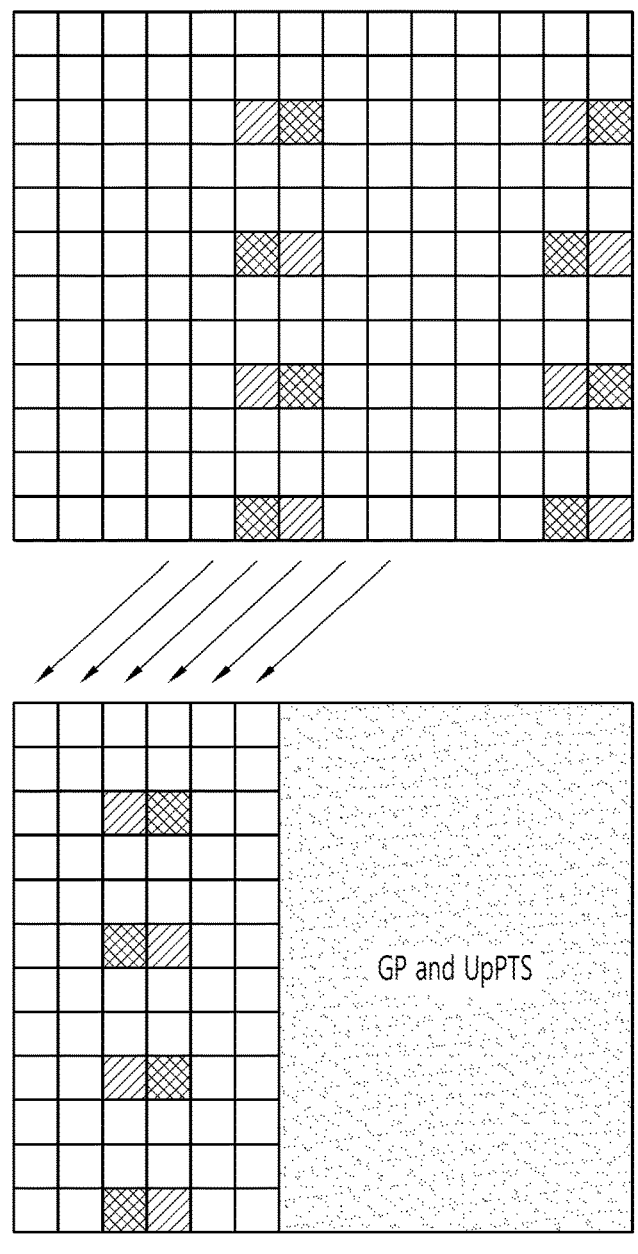
FIG. 20 illustrates an example of method A-2 proposed in Section I-3-4.

FIG. 20 Illustrates an Example of Method A-2 Proposed in Section I-3-4.

The remaining unpunctured OFDM symbols are mapped sequentially to the OFDM symbols not used for the purpose of a GP and UpPTS in the DwPTS region.

The proposed position of a punctured symbol may be different and may be determined to be different according to the position of a DwPTS.

A-3. When the position of an NRS is at the sixth and seventh OFDM symbol within the first slot; configuration index of a special subframe is #1, #2, #6 or #7; or the number of OFDM symbols in a DwPTS region is 9 or 10, the index of a punctured OFDM symbol may include the third to seventh OFDM symbols of the second slot.

Figure 21:
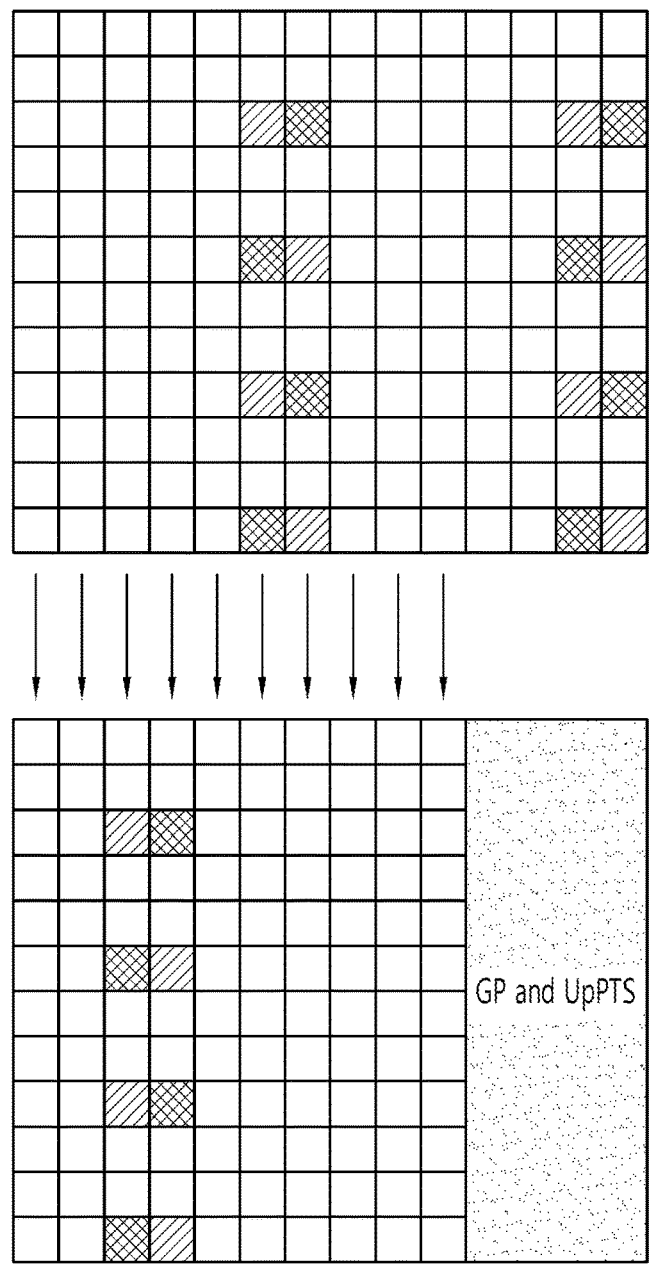
FIG. 21 illustrates an example of method A-3 proposed in Section I-3-4.

FIG. 21 Illustrates an Example of Method A-3 Proposed in Section I-3-4.

When the size of a DwPTS is 9, the index of a punctured OFDM symbol may be determined to correspond to the third to seventh OFDM symbols of the second slot, and the remaining unpunctured OFDM symbols are mapped sequentially to the OFDM symbols not used for the purpose of a GP and UpPTS in the DwPTS region.

When the size of a DwPTS is 10, the index of a punctured OFDM symbol may be determined to correspond to the fourth to seventh OFDM symbols of the second slot, and the remaining unpunctured OFDM symbols are mapped sequentially to the OFDM symbols not used for the purpose of a GP and UpPTS in the DwPTS region.

The proposed position of a punctured symbol may be different and may be determined to be different according to the position of a DwPTS.

When the operation mode is in-band mode, a frequency shift value which determines the position on the frequency domain to which an NRS is transmitted and a method for mapping an NRS may be determined by the index of a symbol to which an NRS is mapped or index of a special subframe configuration.

When the position of an NRS is at the third and fourth OFDM symbol within each slot; configuration index of a special subframe is #3, #4, or #8; or the number of OFDM symbols in a DwPTS region is 11 or 12, the position of an RE to which the NRS is mapped may be determined by the following criterion.

Figure 22:
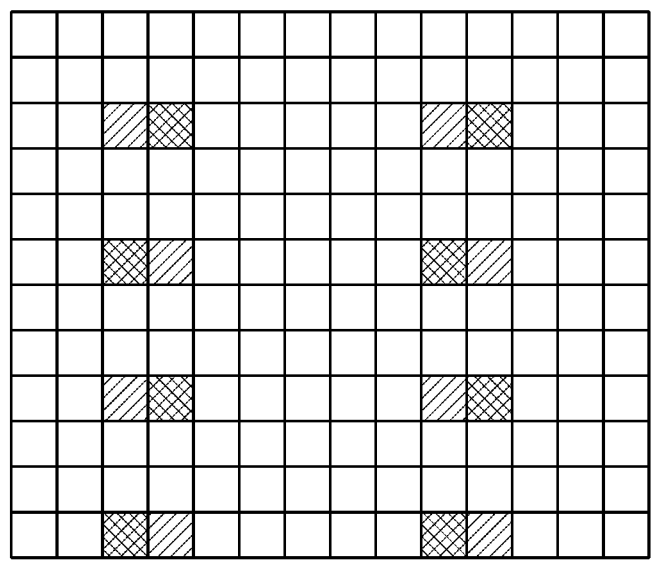
FIG. 22 illustrates an example in which an NRS is mapped to a DwPTS according to Eq. 3.

FIG. 22 Illustrates an Example in which an NRS is Mapped to a DwPTS According to Eq. 3.

$$k = 6m + (v + v_{shift}) \bmod 6 \qquad [\text{Eq. 3}]$$

$$l = N_{symb}^{DL} - 4, N_{symb}^{DL} - 3$$

$$m = 0, 1$$

$$m' = m + N_{RB}^{max,DL} - 1$$

$$v = \begin{cases} 0 & \text{if } p = 2000 \text{ and } l = N_{symb}^{DL} - 3 \\ 3 & \text{if } p = 2000 \text{ and } l = N_{symb}^{DL} - 4 \\ 3 & \text{if } p = 2001 \text{ and } l = N_{symb}^{DL} - 3 \\ 0 & \text{if } p = 2001 \text{ and } l = N_{symb}^{DL} - 4 \end{cases}$$

When the proposed NRS mapping method is used, REs in a data region of a normal DL subframe are repeated in a DwPTS, where a specific method for the aforementioned operation is described below.

Figure 23A:
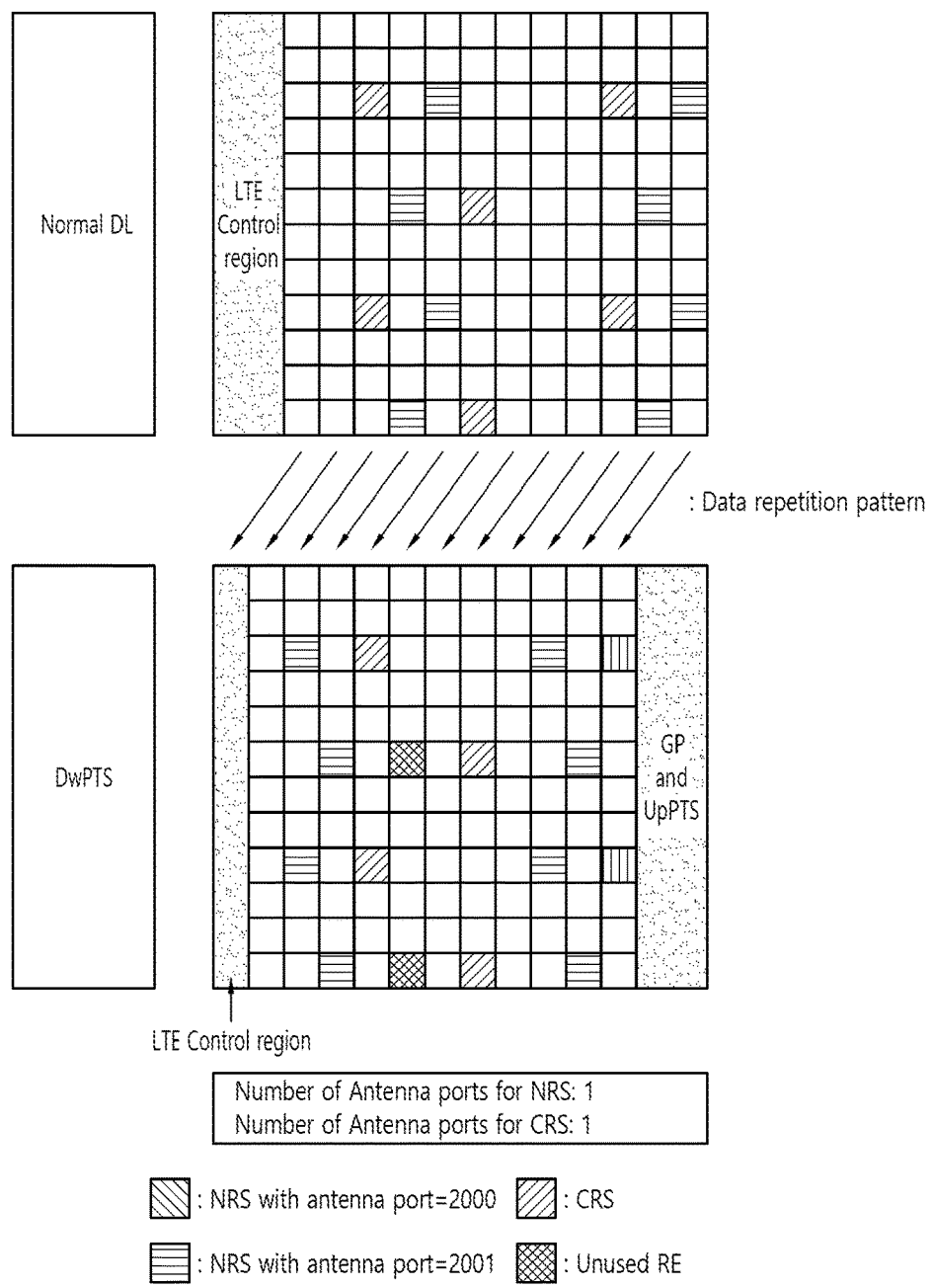
FIGS. 23A to 23C illustrate a first example in which REs of a data region of a normal DL subframe are repeated on a DwPTS.
Figure 23B:
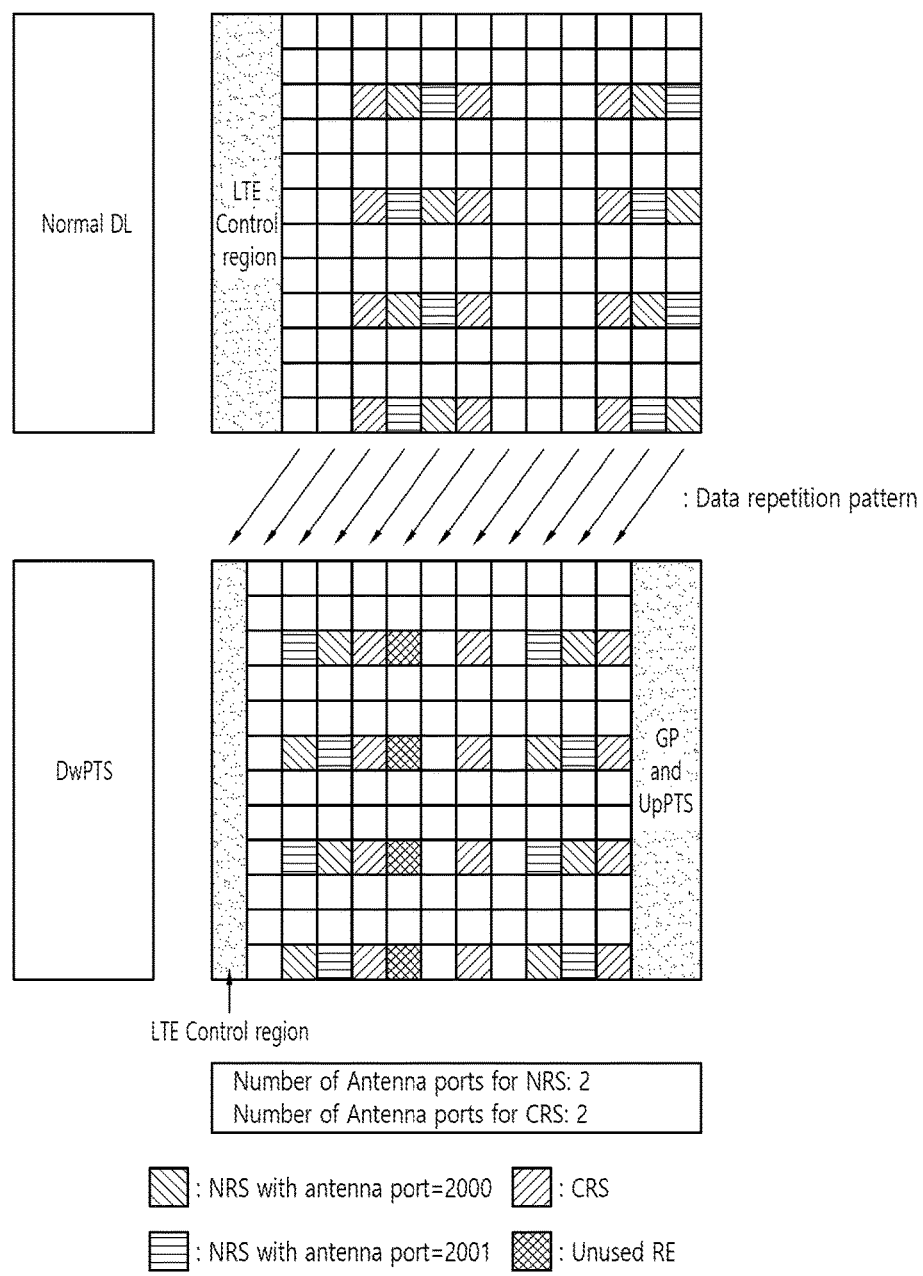
Figure 23C:
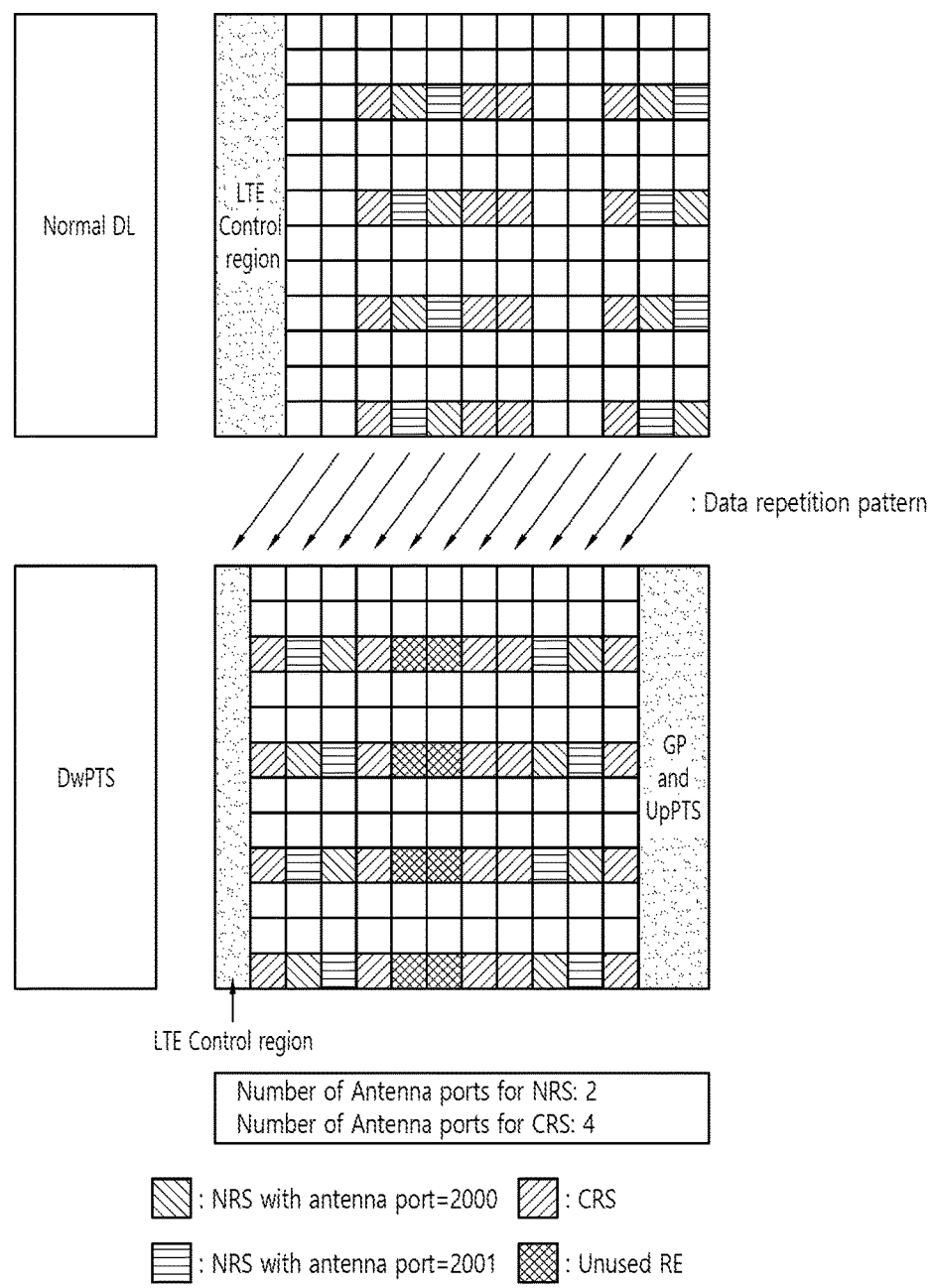

FIGS. 23A to 23C Illustrate a First Example in which REs of a Data Region of a Normal DL Subframe are Repeated on a DwPTS.

Part of OFDM symbols of a normal DL subframe are punctured.

At this time, as shown in FIG. 23, the index of punctured OFDM symbols may include the first and second OFDM symbols of the first slot, which does not affect data transmission of NB-IoT since the OFDM symbols may not be used for the purpose of NB-IoT in a DL subframe.

At this time, the index of a punctured OFDM symbol may include the third OFDM symbol of the first slot, which may be intended to take into account the minimum size of an LTE control region in a DwPTS region.

At this time, the index of a punctured OFDM symbol may include the fourth OFDM symbol of a first slot, which may be intended to guarantee the size of an LTE control region in a DwPTS region. This case may be applied only for the case where the size of the LTE control region in a DwPTS is 2.

At this time, the index of a punctured OFDM symbol may include the seventh OFDM symbol of a second slot. If the size of a DwPTS is limited to 11, the aforementioned condition is not applied to the case where the size of a DwPTS is 12.

The proposed position of a punctured symbol may be determined to be different according to the position of a DwPTS.

The remaining unpunctured OFDM symbols are not used as an LTE control region but are mapped sequentially to the OFDM symbols not used for the purpose of a GP and UpPTS in the DwPTS region.

At this time, if a DL subframe includes such REs that are not meant for data transmission, the corresponding REs are designated as blank REs to which data are not transmitted. A blank RE may be transmitted as being left unused and empty, or a reference signal such as an NRS or CRS may be transmitted by being added to the blank RE.

At this time, data may be punctured at the position of an RE used for the purpose of data in a DL subframe but used as a reference signal in a DwPTS.

The method for transmitting data to a DwPTS may also be applied to the case where the pattern of an NRS is different.

Meanwhile, when the position of an NRS is at the third and fourth OFDM symbol within the first slot; configuration index of a special subframe is #9 or #10; or the number of OFDM symbols in a DwPTS region is 6, the positions of REs to which the NRS is mapped may be determined according to the following criterion.

Figure 24:
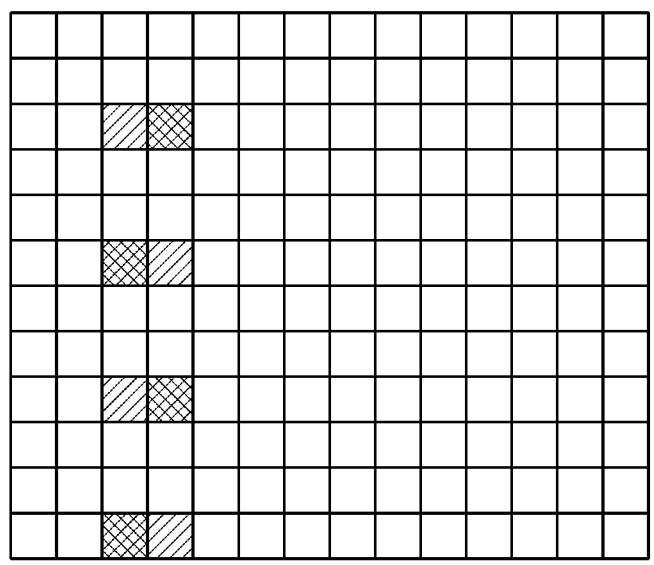
FIG. 24 illustrates an example in which an NRS is mapped to a DwPTS according to Eq. 4.

FIG. 24 Illustrates an Example in which an NRS is Mapped to a DwPTS According to Eq. 4.

$$k = 6m + (v + v_{shift}) \bmod 6 \quad \text{[Eq. 4]}$$

$$l = N_{symb}^{DL} - 4, N_{symb}^{DL} - 3$$

$$m = 0, 1$$

$$m' = m + N_{RB}^{max,DL} - 1$$

$$v = \begin{cases} 0 & \text{if } p = 2000 \text{ and } l = N_{symb}^{DL} - 3 \\ 3 & \text{if } p = 2000 \text{ and } l = N_{symb}^{DL} - 4 \\ 3 & \text{if } p = 2001 \text{ and } l = N_{symb}^{DL} - 3 \\ 0 & \text{if } p = 2001 \text{ and } l = N_{symb}^{DL} - 4 \end{cases}$$

When the NRS mapping method is used, transmission of data to a DwPTS is performed by repeating REs in a data region of a normal DL subframe, where a specific method for the transmission is described below.

Figure 25A:
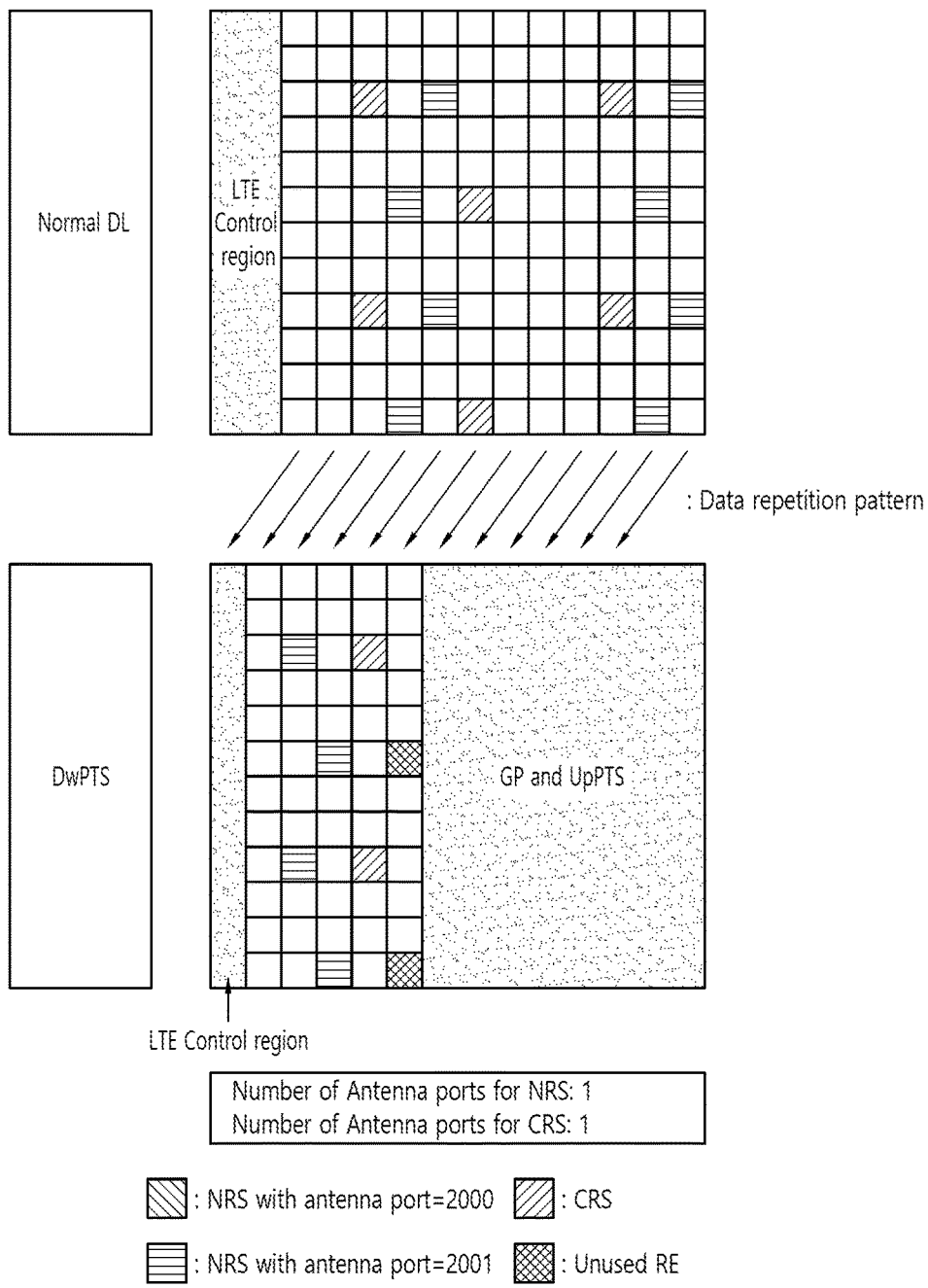
FIGS. 25A to 25C illustrate a second example in which REs of a data region of a normal DL subframe are repeated on a DwPTS.
Figure 25B:
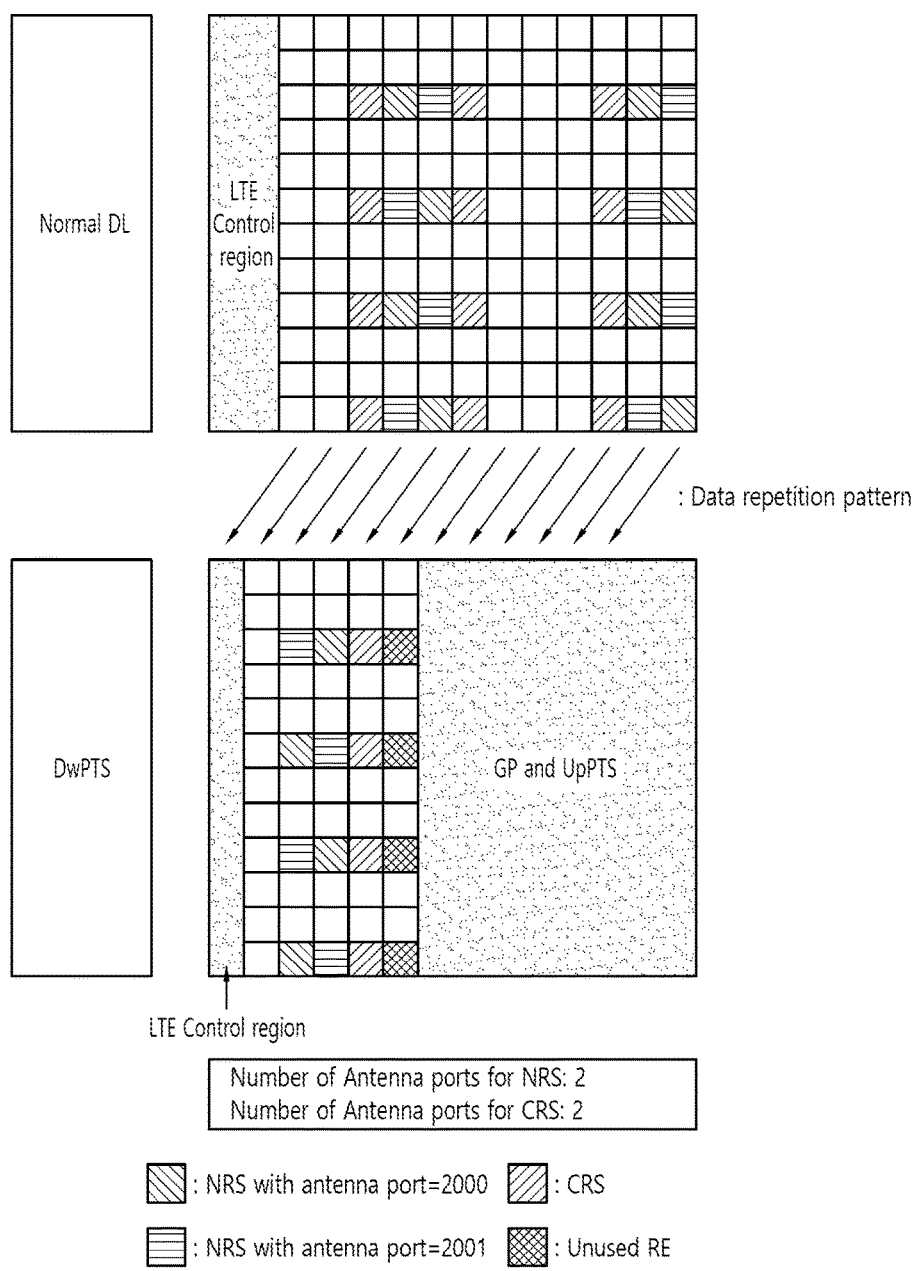
Figure 25C:
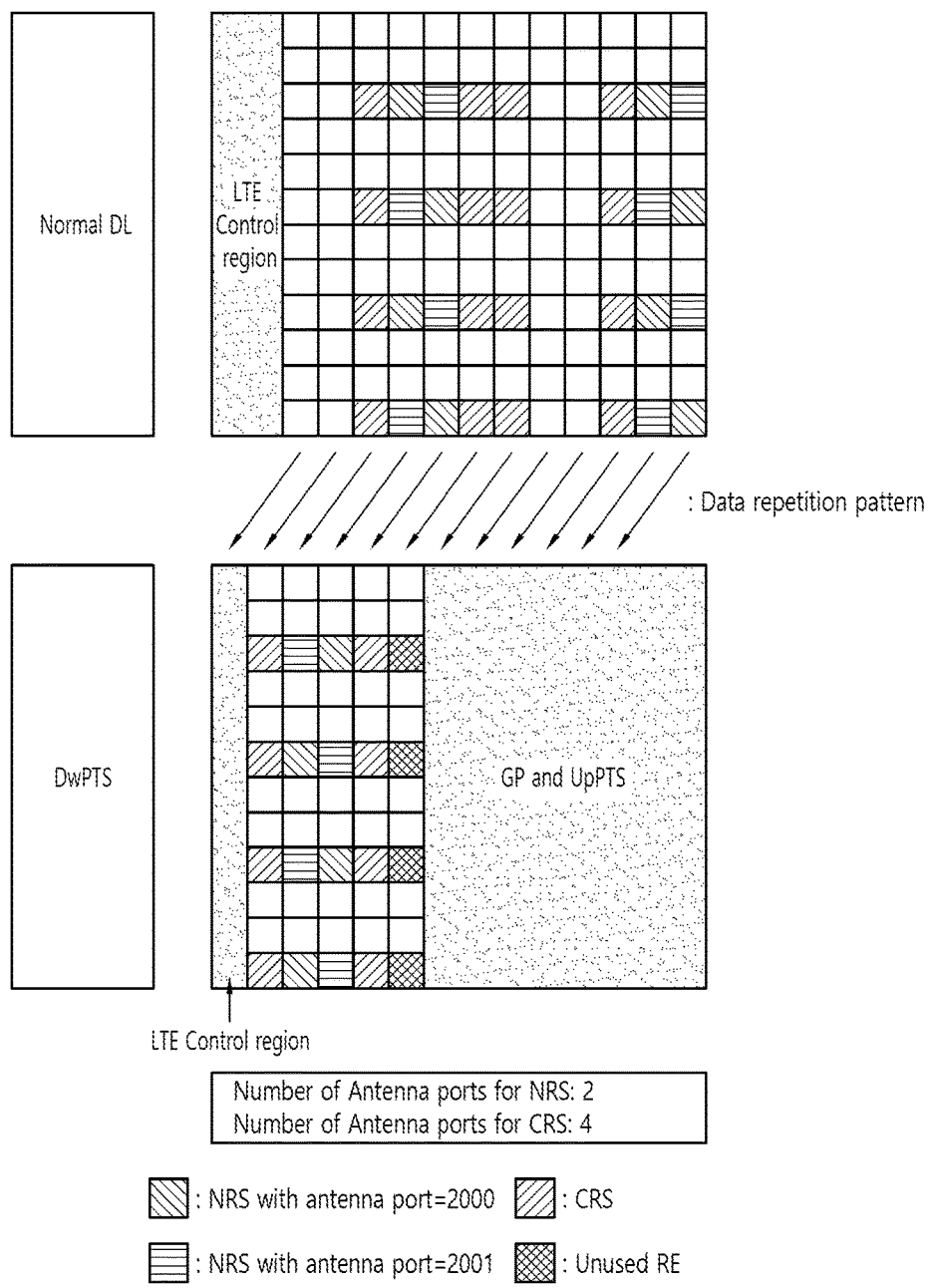

FIGS. 25A to 25C Illustrate a Second Example in which REs of a Data Region of a Normal DL Subframe are Repeated on a DwPTS.

Part of OFDM symbols of a normal DL subframe are punctured.

At this time, as shown in FIG. 25, the index of punctured OFDM symbols may include the first and second OFDM symbols of the first slot, which does not affect data transmission of NB-IoT since the OFDM symbols may not be used for the purpose of NB-IoT in a DL subframe.

At this time, the index of a punctured OFDM symbol may include the third OFDM symbol of the first slot, which may be intended to take into account the minimum size of an LTE control region in a DwPTS region.

At this time, the index of a punctured OFDM symbol may include the fourth OFDM symbol of a first slot, which may be intended to guarantee the size of an LTE control region in a DwPTS region. This case may be applied only for the case where the size of the LTE control region in a DwPTS is 2.

At this time, the index of a punctured OFDM symbol may include the second to the seventh OFDM symbol of a second slot.

The proposed position of a punctured symbol may be determined to be different according to the position of a DwPTS.

The remaining unpunctured OFDM symbols are not used as an LTE control region but are mapped sequentially to the OFDM symbols not used for the purpose of a GP and UpPTS in the DwPTS region.

At this time, if a DL subframe includes such REs that are not meant for data transmission, the corresponding REs are designated as blank REs to which data are not transmitted. A blank RE may be transmitted as being left unused and empty, or a reference signal such as an NRS or CRS may be transmitted by being added to the blank RE.

At this time, data may be punctured at the position of an RE used for the purpose of data in a DL subframe but used as a reference signal in a DwPTS.

The method for transmitting data to a DwPTS may also be applied to the case where the pattern of an NRS is different.

Meanwhile, when the position of an NRS is at the sixth and seventh OFDM symbol within the first slot; configuration index of a special subframe is #1, #2, #6, or #7; or the number of OFDM symbols in a DwPTS region is 9 or 10, the positions of REs to which the NRS is mapped may be determined according to the following criterion.

Figure 26:
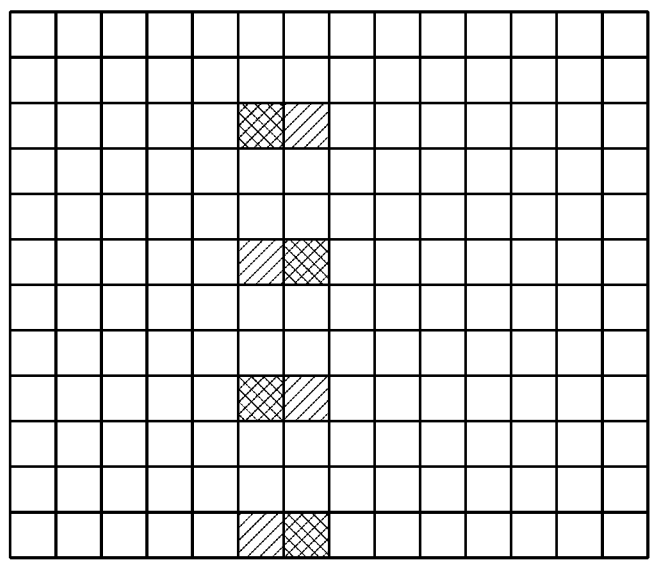
FIG. 26 illustrates an example in which an NRS is mapped to a DwPTS according to Eq. 5.

FIG. 26 Illustrates an Example in which an NRS is Mapped to a DwPTS According to Eq. 5.

$$k = 6m + (v + v_{shift}) \bmod 6 \quad \text{[Eq. 5]}$$

$$l = N_{symb}^{DL} - 2, N_{symb}^{DL} - 1$$

$$m = 0, 1$$

$$m' = m + N_{RB}^{max,DL} - 1$$

$$v = \begin{cases} 0 & \text{if } p = 2000 \text{ and } l = N_{symb}^{DL} - 2 \\ 3 & \text{if } p = 2000 \text{ and } l = N_{symb}^{DL} - 1 \\ 3 & \text{if } p = 2001 \text{ and } l = N_{symb}^{DL} - 2 \\ 0 & \text{if } p = 2001 \text{ and } l = N_{symb}^{DL} - 1 \end{cases}$$

When the NRS mapping method is used, transmission of data to a DwPTS is performed by repeating REs in a data region of a normal DL subframe, where a specific method for the transmission is described below.

Figure 27A:
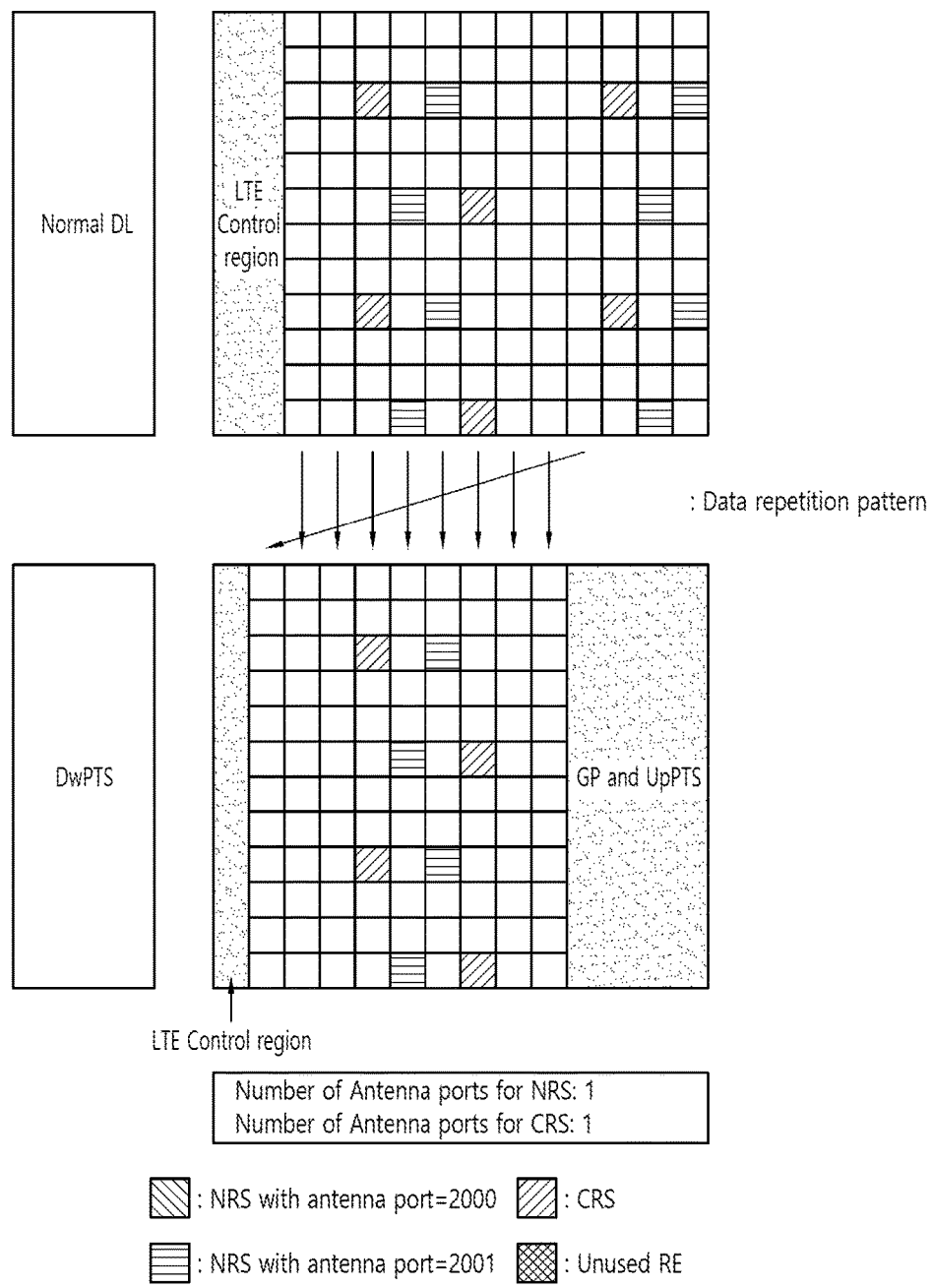
FIGS. 27A to 27C illustrate a third example in which REs of a data region of a normal DL subframe are repeated on a DwPTS.
Figure 27B:
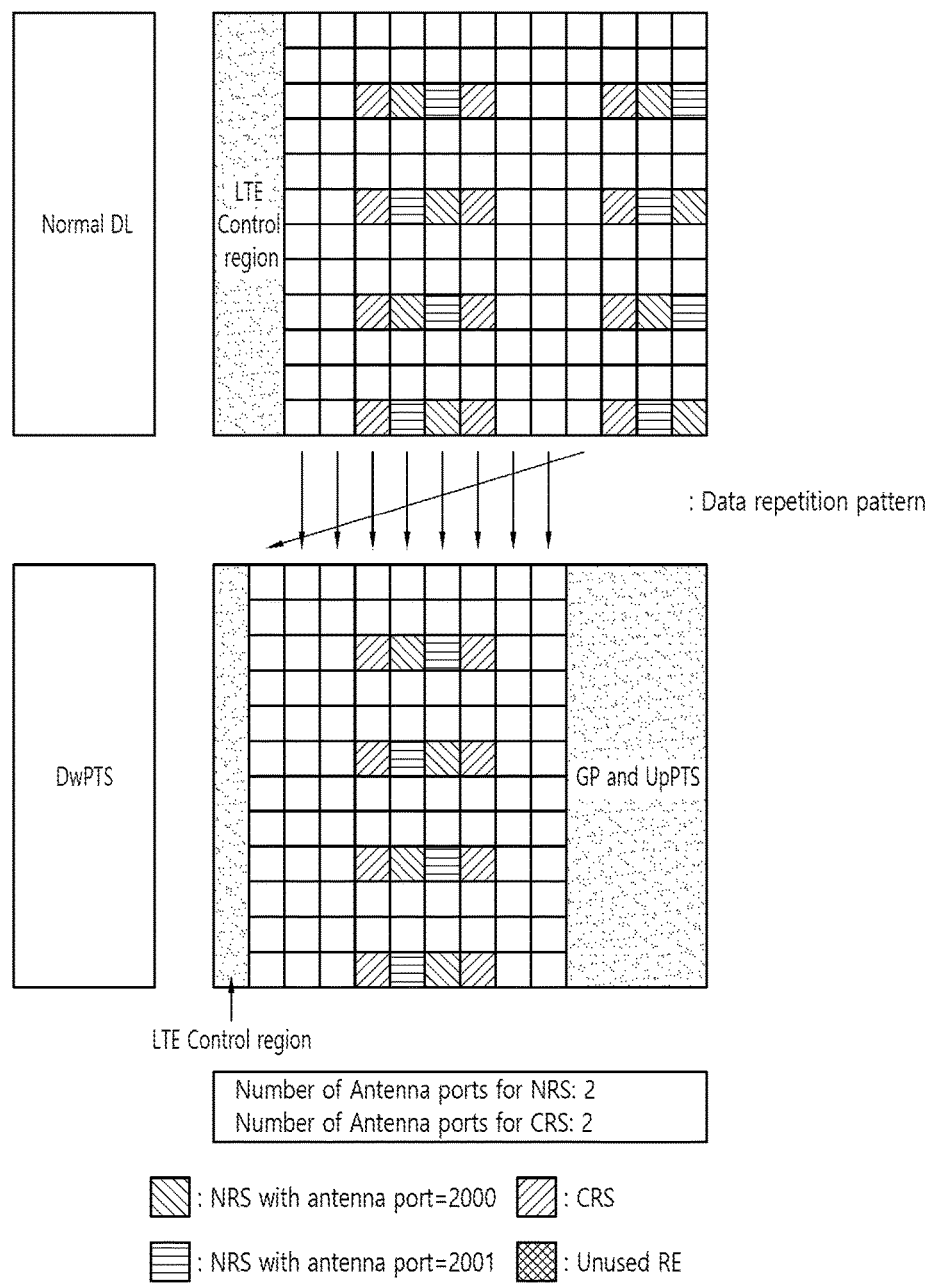
Figure 27C:
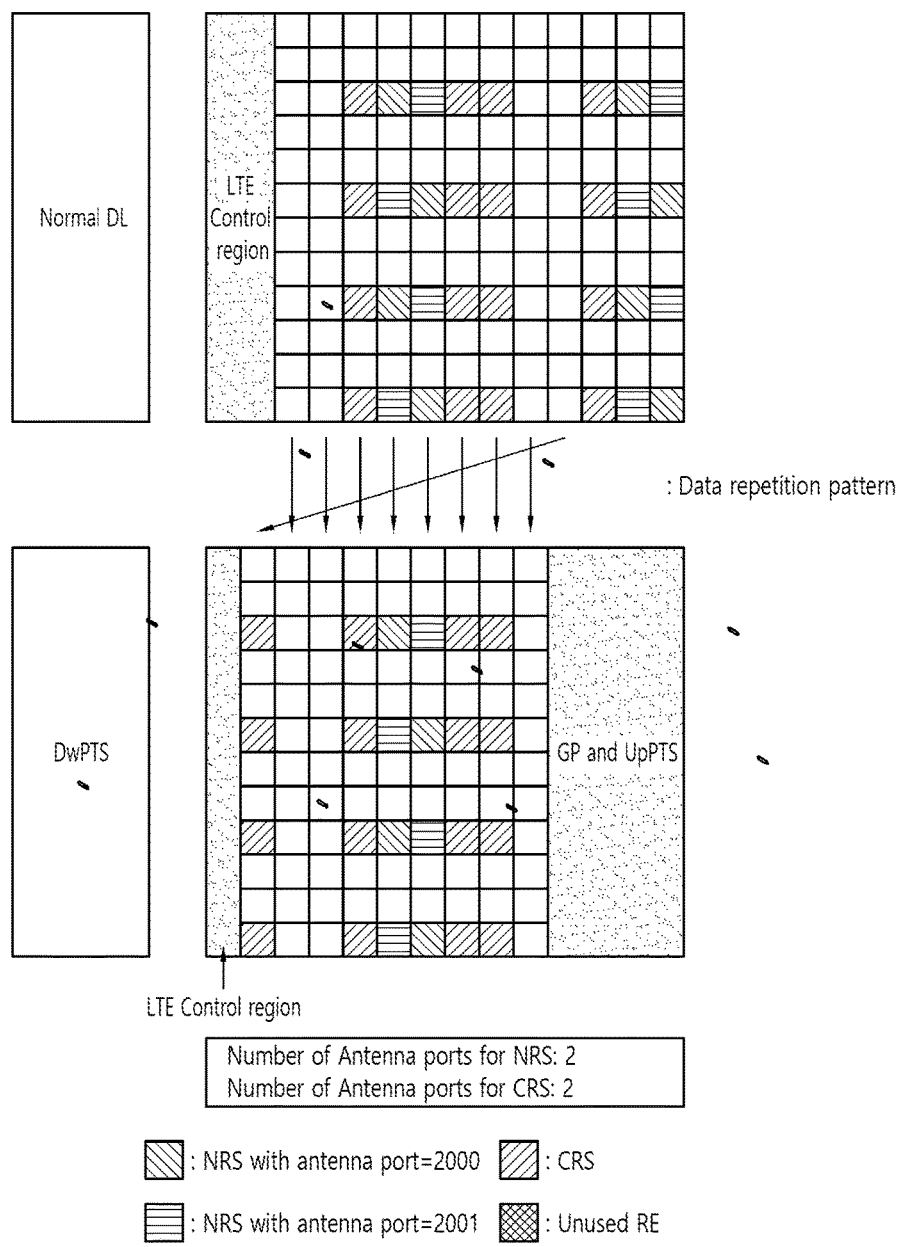

FIGS. 27A to 27C Illustrate a Third Example in which REs of a Data Region of a Normal DL Subframe are Repeated on a DwPTS.

Part of OFDM symbols of a normal DL subframe are punctured.

At this time, as shown in FIG. 27, the index of punctured OFDM symbols may include the first and second OFDM symbols of the first slot, which does not affect data transmission of NB-IoT since the OFDM symbols may not be used for the purpose of NB-IoT in a DL subframe.

At this time, the index of a punctured OFDM symbol may include the third OFDM symbol of the first slot, which may be intended to take into account the minimum size of an LTE control region in a DwPTS region.

At this time, when OFDM symbols not constrained to the two conditions are available for the purpose of DL transmission in a DwPTS, symbols having the same index within a DL subframe are excluded from puncturing.

At this time, when the size of an LTE control region of a normal DL subframe is C1, and an LTE control region of a DwPTS is C2, C1−C2 symbols among the remaining OFDM symbols not satisfying the three conditions are employed for data transmission of the DwPTS.

At this time, the remaining OFDM symbols not satisfying the conditions may all be determined to be punctured.

The proposed position of a punctured symbol may be determined to be different according to the position of a DwPTS.

The remaining unpunctured OFDM symbols are not used as an LTE control region but are mapped to the OFDM symbols not used for the purpose of a GP and UpPTS in the DwPTS region.

At this time, if a DL subframe includes such REs that are not meant for data transmission, the corresponding REs are designated as blank REs to which data are not transmitted. A blank RE may be transmitted as being left unused and empty, or a reference signal such as an NRS or CRS may be transmitted by being added to the blank RE.

At this time, data may be punctured at the position of an RE used for the purpose of data in a DL subframe but used as a reference signal in a DwPTS.

The method for transmitting data to a DwPTS may also be applied to the case where the pattern of an NRS is different.

I-4. Downlink Physical Channel Scheduling

Methods proposed in the present invention may include a method for scheduling a downlink physical channel on time domain resources in slot units.

I-4-1. In the TDD Scheme, Transmission of a Downlink Physical Channel May be Scheduled in Slot Units.

More specifically, when an NPDSCH is scheduled in slot units, the DCI region of an NPDCCH scheduling the NPDSCH may include 1-bit information expressing the indexes of a first and second slots.

When the method is applied, starting timing of an NPDSCH may be calculated through a combination of information indicating a scheduling delay in a DCI region and information indicating slot scheduling. For example, when a scheduling delay is determined by k subframes, and a first slot is indicated to be used, an NPDSCH may be expected to be transmitted after 2k slots from the last subframe to which an NPDCCH has been transmitted. Or when a scheduling delay is determined by k subframes, and a second slot is indicated to be used, an NPDSCH may be expected to be transmitted after 2k+1 slots from the last subframe to which an NPDCCH has been transmitted.

II. Second Disclosure

The second disclosure proposes a method for determining repetition for transmission of an uplink (UL) and downlink (DL) in the NB-IoT performing TDD operations.

In the NB-IoT FDD operation, one transmission block may be transmitted on one or more subframes. Also, one transmission block may be transmitted repeatedly one or more times. In what follows, for the convenience of descriptions, a transmission block may include a plurality of sub-transmission blocks, and one sub-transmission block may be transmitted on one subframe. If one transmission block is divided into N sub-transmission blocks and transmitted repeatedly R times, the total number of subframes employed for transmission becomes N×R. At this time, a repetition scheme may be designed by taking into account the following two characteristics. (1) The same sub-transmission block is repeated over contiguous subframes so that symbol-level combining may be performed easily. This is so designed because, if the same sub-transmission blocks are located being separated far away from each other on the time domain, a gain from symbol-level combining may disappear. (2) The number of times that the same sub-transmission block is repeated contiguously is limited so that early decoding termination which finishes decoding early is made possible before all of repeated transmission blocks are received. Through the condition above, repetition in the NB-IoT FDD scheme may be defined as follows.

II-1. Repetition Method in the NB-IoT FDD

If a transmission block composed of N sub-transmission blocks is repeated R times, each sub-transmission block of the transmission block are transmitted through $R_1$=min(R, 4) contiguous subframes. If each sub-transmission block constituting a transmission block is repeated $R_1$ times sequentially from the first subframe and a total of N× $R_1$ subframes are constructed, N×$R_1$ subframes are repeated R/$R_1$ times. The constant 4 is used for transmitting the same subframe contiguously up to four times. After the same subframe is repeated $R_1$=min(R, 4) times, other subframe may be transmitted repeatedly. For example, suppose four subframes constitute one transmission block. At this time, for the sake of convenience, the four subframes are denoted as a, b, c, and d. If the number of repetitions of an NPDSCH Rep=2, the subframes may be transmitted in a pattern of a, a, b, b, c, c, d, d. And if Rep=4 or more, the subframes may be transmitted in a pattern of a, a, a, a, b, b, b, b, c, c, c, c, d, d, d, d.

In the present invention, contiguous subframes indicate the subframes the sequence number of which is consecutive on the time domain with reference to a valid subframe. For example, if one or more invalid subframes exist between two valid DL subframes, but other valid DL subframes do not exist between them, the two subframes may be defined as consecutive subframes, which may be defined in the same way for the case of UL transmission. At this time, valid subframes indicate available subframes for the purpose of an NPUSCH in the case of UL transmission, and available subframes for the purpose of an NPDCCH or NPDSCH in the case of DL transmission.

Figure 28:
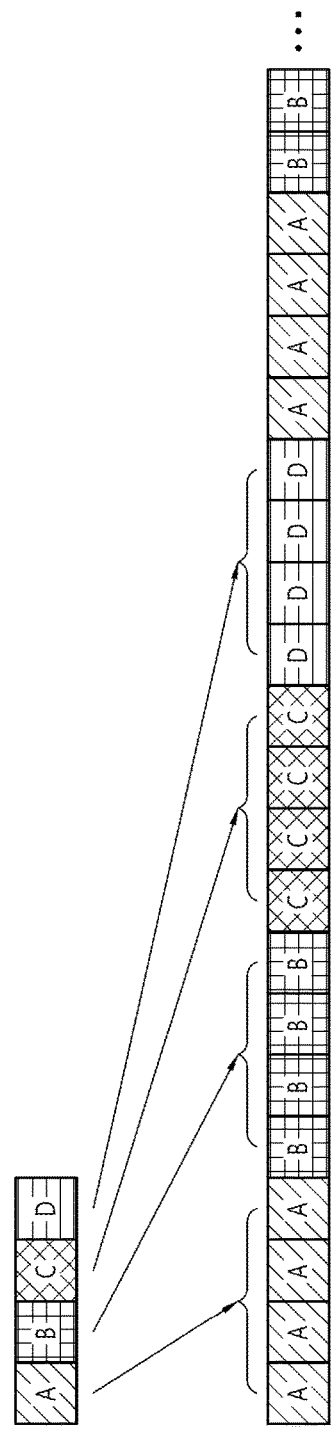
FIG. 28 illustrates a method for applying repetition in the NB-IoT FDD scheme.

FIG. 28 Illustrates a Method for Applying Repetition in the NB-IoT FDD Scheme.

FIG. 28 illustrates an example where a transmission block is composed of four sub-transmission blocks, and repetition of a size R>4 is applied.

In the case of NB-IoT FDD, since UL or DL transmission is performed through a separate carrier, contiguous UL or DL subframes are adjoining or adjacent to each other on the time domain, and if the repetition method described above is used, an effect of symbol-level combining may be readily obtained. On the other hand, in the TDD structure, the repetition method defined in the FDD scheme may not be suitable for performing symbol-level combining.

FIG. 29 Illustrates TDD UL/DL Configurations.

The TDD UL/DL configuration is so structured because, since UL and DL transmission are performed in the same carrier for the case of TDD scheme, (1) the number of consecutive UL or DL subframes that are adjacent to each other on the time domain may be limited according to an UL/DL configuration, and (2) the case where consecutive UL or DL subframes are located far away from each other on the time domain may occur relatively more often than in the FDD scheme, making it unsuitable for performing symbol-level combining.

To solve the problem above, the present section proposes a repetition method which takes into account the TDD structure when repetition of a transmission block is performed according to an NB-IoT TDD situation. Although the method proposed in the present section is described by taking into specific account an NB-IoT TDD situation, it should be clearly understood that the proposed method may be generally applied to other communication systems in which a transmission unit composed of one or more symbols is transmitted repeatedly on the time domain, and symbol-level combining and early decoding termination are considered. Also, although the present section assumes the unit of a sub-transmission block as one subframe for the convenience of descriptions, it is clear that the same method may be applied with reference to a transmission unit (for example, a slot or NB-slot) composed of one or more symbols. The methods described below may all be used independently from each other, but a combination of two or more methods may also be used.

II-1-1. Method for Limiting the Maximum Number that the Same Sub-Transmission Block is Repeated to Two.

The present section proposes a method for limiting the maximum number that the same sub-transmission block is repeated over contiguous subframes to two. At this time, in a situation where a transmission block is repeated R times, the number that the same sub-transmission block is repeated over contiguous subframes may be determined by $R_1=\min(R, 2)$. This may be aimed at increasing the effect of early decoding termination since symbol-level combining using four adjoining or adjacent subframes is difficult to be performed for most cases due to the inherent limitation of the TDD scheme. On the other hand, allowing the same sub-transmission block to be repeated successively twice may be aimed that if the same sub-transmission block is repeated over two adjoining or adjacent UL or DL subframes, a UE may perform symbol-level combining on the two subframes. A repetition method in the NB-IoT TDD using the scheme above may be determined as follows.

If a transmission block composed of N sub-transmission blocks is repeated R times, each sub-transmission block of the transmission block is transmitted through $R_1=\min(R, 2)$ contiguous subframes. If individual sub-transmission blocks constituting a transmission block are repeated $R_1$ times sequentially from the first sub-transmission block, and a total of $N \times R_1$ subframes are constructed, $N \times R_1$ subframes are repeated $R/R_1$ times.

II-1.2. Method for Determining the Maximum Number that the Same Sub-Transmission Block is Repeated According to UL/DL Configuration The present section proposes a method for determining the maximum number of times that the same sub-transmission block is repeated successively according to an UL/DL configuration. The number of UL or DL subframes appearing in contact with each other on the time domain may have a different value depending on an UL/DL configuration. Therefore, the size of a subframe appropriate for symbol-level combining may be different depending on the UL/DL configuration. Also, when the number of contiguous sub-transmission blocks is limited to enable early decoding termination, a method for applying repetition which takes into account the limitation may be needed.

Even if each UL/DL configuration is selected, the maximum number of times that the same sub-transmission block is repeated successively may be different between UL and DL cases. This is so because the number of adjoining UL subframes and the number of adjoining DL subframes may be different from each other even if the same UL/DL configuration is used.

When the aforementioned conditions are used, and a transmission block is repeated R times, the number of repetitions that the same sub-transmission block is disposed in succession may be determined by $R_1=\min(R, R_{maxrep\text{-}sameSF})$. At this time, $R_{maxrep\text{-}sameSF}$ denotes the maximum number of times that the same sub-transmission block may be repeated successively, which may be different according to the entity (UL or DL) which performs the UL/DL configuration and transmission.

The table below shows one example of the maximum number that the same sub-transmission block is repeated successively according to an UL/DL configuration.

TABLE 12

| UL/DL configuration | Maximum $R_{maxrep\text{-}sameSF}$ for UL | Maximum $R_{maxrep\text{-}sameSF}$ for DL |
|---|---|---|
| 0 | 4 | 1 |
| 1 | 2 | 2 |
| 2 | 1 | 4 |
| 3 | 4 | 4 |
| 4 | 2 | 4 |
| 5 | 1 | 4 |
| 6 | 2 | 2 |

In the table above, the size of $R_{maxrep\text{-}sameSF}$ is $2^n$ (n=0, 1, 2, . . . ). This may be aimed so that when a total number of repetitions available in the NB-IoT is divided by $R_{maxrep\text{-}sameSF}$, the quotient becomes an integer number. When the method of Section II-1-2 is used in the NB-IoT TDD, and the size of $R_{maxrep\text{-}sameSF}$ is $2^n$ (n=0, 1, 2, . . . ), a repetition method may be determined as follows.

If a transmission block composed of N sub-transmission blocks is repeated R times, each sub-transmission block of the transmission block is transmitted through $R_1=\min(R, R_{maxrep\text{-}sameSF})$ contiguous subframes. If individual sub-transmission blocks constituting a transmission block are repeated $R_1$ times sequentially from the first sub-transmission block, and a total of $N \times R_1$ subframes are constructed, $N \times R_1$ subframes are repeated $R/R_1$ times.

If the size of $R_{maxrep\text{-}sameSF}$ is not a power of 2 (for example, $R_{maxrep\text{-}sameSF}$=3 or 5), $R/R_{maxrep\text{-}sameSF}$ in the repetition method may not yield an integer value, for which case the repetition method may not be applied. To compensate for this case, the method of Section II-1-2 is used for the NB-IoT TDD, and when the size of $R_{maxrep\text{-}sameSF}$ has a value other than $2^n$ (n=0, 1, 2, . . . ), the repetition method may be performed as follows.

The case where the method of Section II-1-2 is used, and the size of $R_{maxrep\text{-}sameSF}$ is not $2^n$ (n=0, 1, 2, . . . )

If a transmission block composed of N sub-transmission blocks is repeated R times, each sub-transmission block of the transmission block is transmitted through $R_1=\min(R, R_{maxrep\text{-}sameSF})$ contiguous subframes. If individual sub-transmission blocks constituting a transmission block are repeated $R_1$ times sequentially from the first sub-transmission block, and a total of $N \times R_1$ subframes are constructed, $N \times R_1$ subframes are repeated $R'=\text{floor}(R/R_1)$ times. If $R-R' \neq 0$, the remaining $N \times (R-R')$ subframes are transmitted such that the same sub-transmission block is repeated $R-R'$ times and disposed contiguously.

Figure 30:
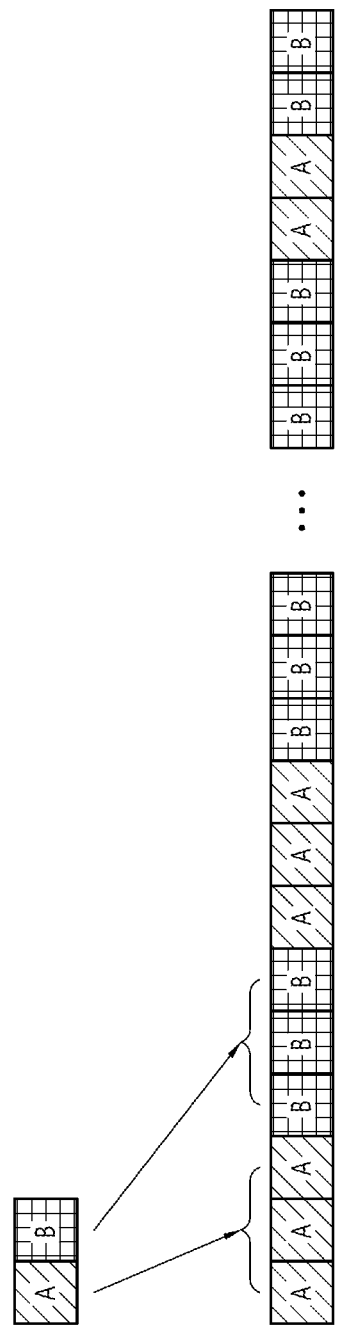
FIG. 30 illustrates a method of Section II-1-2.

FIG. 30 Illustrates a Method of Section II-1-2.

FIG. 30 illustrates an example where a transmission block is composed of two sub-transmission blocks, $R_{maxrep\text{-}sameSF}$=3, and $R-R'$=2.

II-1-3. Method for Fixing a Starting Subframe

The present section proposes a method for fixing the position of a starting subframe at which transmission of a transmission block is started to increase the gain of symbol-level combining that may be obtained when the same sub-transmission block is repeated successively. At this time, the fixed position may be an UL subframe that appears first after a special subframe in the case of UL transmission and in the case of DL transmission, a DL subframe that appears first after an UL subframe. For example, with reference to FIG. 30, in the case of UL/DL configuration#0, an UL starting subframe may be subframe 2 and 7; a DL starting subframe may be subframe 0 and 5; in the case of UL/DL configuration#1, an UL starting subframe may be subframe 2 and 7; and a DL starting subframe may be subframe 4 and 9.

The aforementioned scheme may be intended so that when the same sub-transmission block is repeated successively, the repeated sub-transmission blocks are made to adjoin each other on the time domain, thereby increasing the gain of symbol-level combining. To this purpose, the method of Section II-1-3 may be used in conjunction with the method of Section II-1-2 (or II-1-1). For example, if the method of Section II-1-3 is used in conjunction with the method of Section II-1-2, the repetition method may be performed as follows.

Repetition Method where the Method of Section II-1-2 Uses the Method of Section II-1-3

If a transmission block composed of N sub-transmission blocks is repeated N times, each sub-transmission block of the transmission block is transmitted through $R_1=\min(R, R_{maxrep-sameSF})$ contiguous subframes. If sub-transmission blocks constituting a transmission block are repeated sequentially $R_1$ times from the first sub-transmission block, and a total of $N \times R_1$ subframes are constructed, $N \times R_1$ subframes are repeated $R'=\text{floor}(R/R_1)$ times. If $R-R' \neq 0$, the remaining $N \times (R-R')$ subframes are transmitted such that the same sub-transmission block is repeated $R-R'$ times and disposed contiguously. At this time, the first subframe at which transmission is started may be determined by an UL/DL configuration.

II-1-4. Method for Repeating One Sub-Transmission Block on One Radio Frame

The present section proposes a method for repeating only the same sub-transmission block successively on one radio subframe to increase the gain of symbol-level combining. At this time, the number of times that the same sub-transmission block is repeated within a radio frame may be determined to be the same as the number of valid subframes within the corresponding radio frame.

The proposed method may be applied only to the case where the number of times R that a transmission block is repeated is larger than a specific value $R_{thr}$. This may be intended to prevent unnecessary repetitions and to obtain the effect of early decoding termination when the number of repetitions required for a transmission block is small. At this time, the value of $R_{thr}$ may be applied differently according to an UL/DL configuration.

If the number of repetitions for a transmission block is set to R by the proposed method, the number of radio frames to which the respective sub-transmission blocks are mapped may set to R or by a function of R.

II-1-5. Method for Determining Repetition Methods of an Anchor Carrier and Non-Anchor Carrier Differently from Each Other The present section proposes a method for determining repetition methods for an anchor carrier and non-anchor carrier differently from each other. The anchor carrier in the NB-IoT may be defined as a carrier transmitted by an NPSS/NSSS/NPBCH/NB-SIB1. At this time, the NPSS/NSSS/NPBCH/NB-SIB1 are signals and channels meant for connecting to an eNB or obtaining necessary system information by a UE and are set to be transmitted every radio frame or at a specific period. Therefore, compared with a non-anchor carrier, an anchor carrier may lack available valid DL subframe resources. Therefore, valid DL subframes at adjoining or adjacent positions on the time domain where a gain from symbol-level combining is obtained may be unavailable or occur infrequently. Taking into account the aforementioned issue, the present section proposes a method for applying a repetition rule having a structure that a large effect of early decoding termination is obtained for an anchor carrier while an effect of symbol-level combining is obtained for a non-anchor carrier.

To obtain the object above, a repetition in units of transmission blocks may be applied to an anchor carrier. For example, when a transmission block is composed of N sub-transmission blocks, N different sub-transmission blocks may be configured to be disposed sequentially over N contiguous subframes, which are then repeated R times in transmission block units. On the other hand, in the case of a non-anchor carrier, one of the methods of Section II-1-1, II-1-2, II-1-3, and II-1-4 may be used, or one or more methods thereof may be used in conjunction with each other. If the method of Section II-1-5 is used, a repetition method for an anchor carrier may be performed as follows.

Repetition Method Using the Method of Section II-1-5 (in the Case of an Anchor Carrier)

If a transmission block composed of N sub-transmission blocks is repeated R times, each sub-transmission block of the transmission block is transmitted through $R_1=1$ contiguous subframes. If sub-transmission blocks constituting a transmission block are repeated sequentially $R_1$ times from the first sub-transmission block, and a total of $N \times R_1$ subframes are constructed, $N \times R_1$ subframes are repeated $R/R_1$ times.

Figure 31:
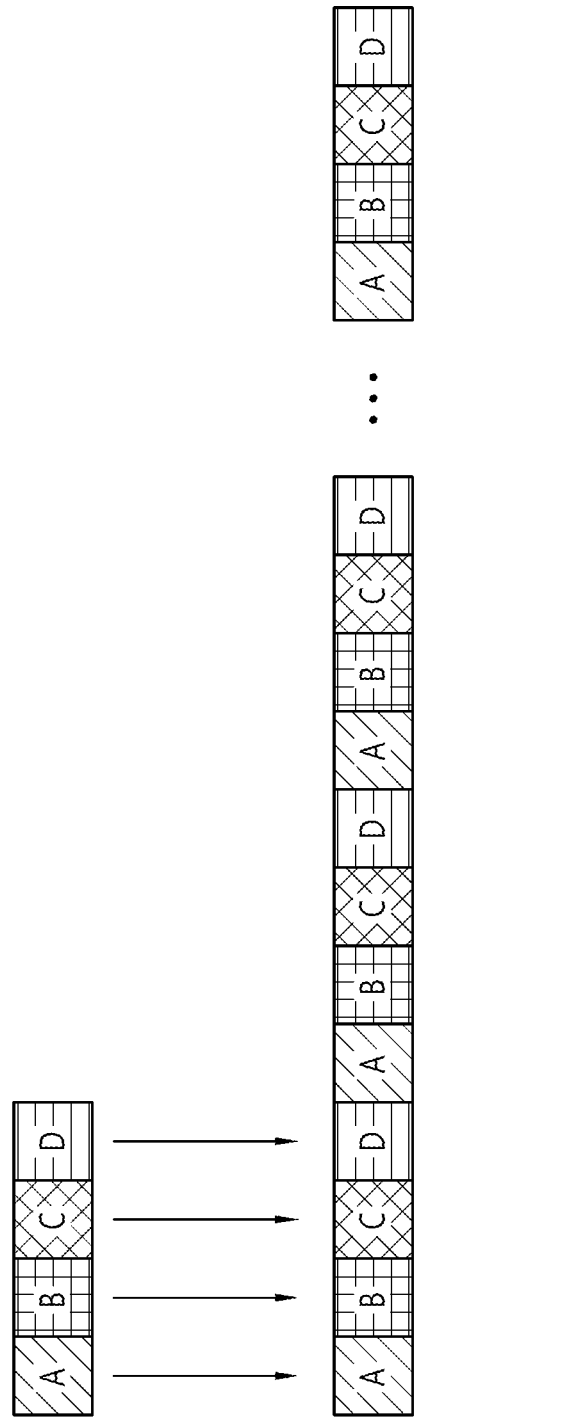
FIG. 31 illustrates an example in which repetition is applied to an anchor carrier.

FIG. 31 Illustrates an Example in which Repetition is Applied to an Anchor Carrier.

In the exemplary descriptions given above, methods are described in the form of a series of steps or blocks. However, the present invention is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present invention.

The embodiments of the present invention described above may be implemented through various means. For example, embodiments of the present invention may be implemented by hardware, firmware, software, or a combination thereof. More specifically, implementation of the embodiments will be described with reference to appended drawings.

Figure 32:
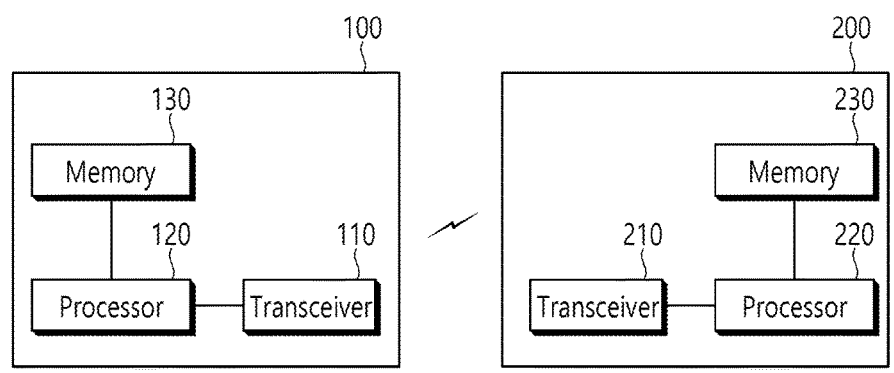
FIG. 32 illustrates a block diagram of a wireless device and a base station to which a disclosure of the present specification is applied.

FIG. 32 Illustrates a Block Diagram of a Wireless Device and a Base Station to which a Disclosure of the Present Specification is Applied.

Referring to FIG. 32, a wireless device 100 and a base station 200 may implement the disclosure of the present invention.

The wireless device 100 comprises a processor 101, memory 102, and transceiver 103. In the same manner, the base station 200 comprises a processor 201, memory 202, and transceiver 203. The illustrated processor 101, 201, memory 102, 202, and transceiver 103, 203 may be implemented by separate chips, respectively, or at least two or more blocks/functions may be implemented through a single chip.

The transceiver 103, 203 comprises a transmitter and a receiver. When a specific operation is performed, either of the transmitter and receiver operations may be performed or both of the transmitter and receiver operations may be performed. The transceiver 103, 203 may include one or more antenna transmitting and/or receiving a radio signal. Also, the transceiver 103, 203 may include an amplifier for amplifying a reception signal and/or transmission signal and a bandpass filter for transmitting a signal to a specific frequency band.

The processor 101, 201 may implement functions, processes, and/or methods proposed in the present specification. The processor 101, 201 may include an encoder and a decoder. For example, the processor 101, 201 may perform the operations described above. The processor 101, 201 may include an application-specific integrated circuit (ASIC), other chipset, logic circuit, data processing device and/or converter which converts a baseband signal to a radio signal and vice versa.

The memory 102, 202 may include a read-only memory (ROM), random access memory (RAM), flash memory, memory card, storage medium and/or other storage device.

Figure 33:
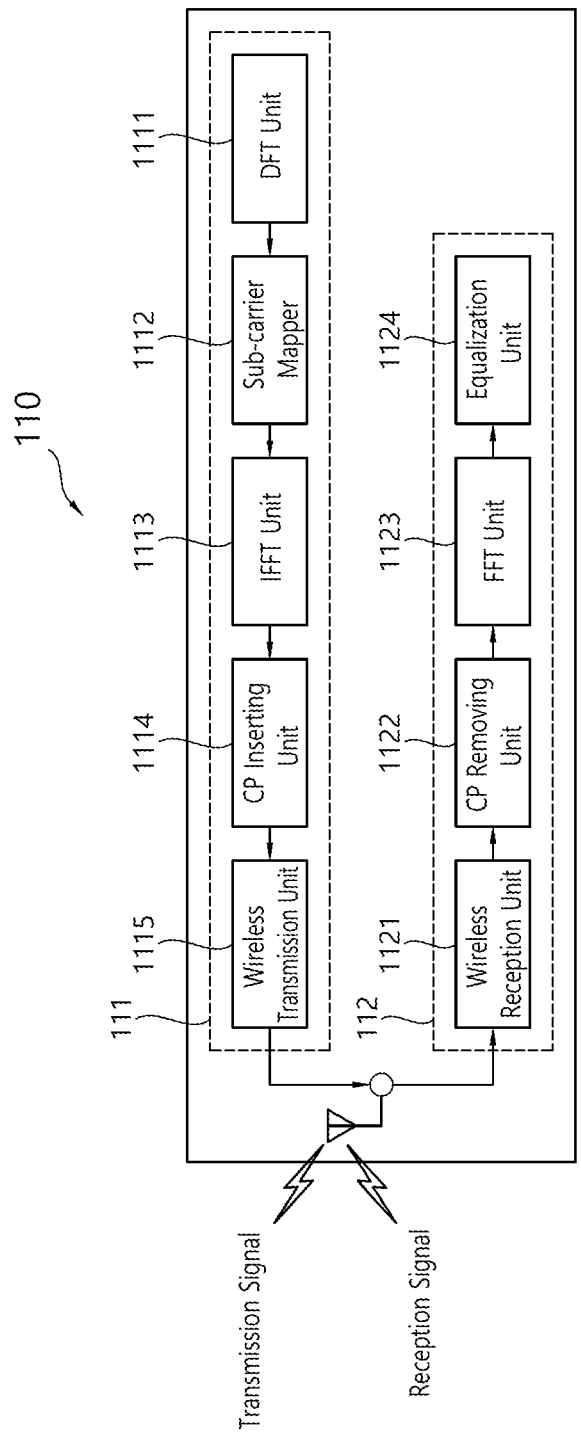
FIG. 33 illustrates a detailed block diagram of a transceiver of a wireless device of FIG. 32.

FIG. 33 Illustrates a Detailed Block Diagram of a Transceiver of a Wireless Device of FIG. 32.

Referring to FIG. 33, the transceiver 110 comprises a transmitter 111 and a receiver 112. The transmitter 111 includes a Discrete Fourier Transform (DFT) unit 1111, sub-carrier mapper 1112, IFFT unit 1113, CP inserting unit 1114, wireless transmission unit 1115. The transmitter 111 may further include a modulator. Also, for example, the transmitter 111 may further include a scramble unit (not shown), modulation mapper (not shown), layer mapper (not shown), and layer permutator (not shown), which may be disposed before the DFT unit 1111. In other words, to prevent increase of peak-to-average power ratio (PAPR), the transmitter 111 makes information go through the DFT unit 1111 before mapping a signal to a sub-carrier. The sub-carrier mapper 1112 performs sub-carrier mapping on a signal spread (or precoded in the same context) by the DFT unit 1111, after which the Inverse Fast Fourier Transform (IFFT) unit 1113 transforms the sub-carrier mapped signal again to a signal on the time axis.

The DFT unit 1111 performs DFT on input symbols and outputs complex-valued symbols. For example, if Ntx symbols are received (where Ntx is a natural number), the DFT size becomes Ntx. The DFT unit 1111 may be called a transform precoder. The sub-carrier mapper 1112 maps the complex-valued symbols to the respective sub-carriers in the frequency domain. The complex-valued symbols may be mapped to resource elements corresponding to resource blocks allocated for data transmission. The sub-carrier mapper 1112 may be called a resource element mapper. The IFFT unit 1113 performs IFFT on the input symbols and outputs a baseband signal for data, which is a time-domain signal. The CP inserting unit 1114 copies a portion of the trailing part of a baseband signal for data and inserts the copied portion to the front part of the baseband signal for data. Through CP insertion, inter-symbol interference (ISI) and inter-carrier interference (ICI) are prevented, and thereby orthogonality may be maintained even in a multi-path channel.

Meanwhile, the receiver 112 comprises a wireless reception unit 1121, CP removing unit 1122, FFT unit 1123, and equalization unit 1124. The wireless reception unit 1121, CP removing unit 1122, and FFT unit 1123 perform inverse functions of the wireless transmission unit 1115, CP inserting unit 1114, and IFFT unit 1113 of the transmitter 111. The receiver 112 may further include a demodulator.

What is claimed is:

1. A method for receiving a downlink physical channel by a Narrowband Internet of Things (NB-IoT) device, the method comprising:

determining whether to receive a signal of a downlink physical channel from an NB-IoT cell on a Downlink Pilot Time Slot (DwPTS) of a Time Division Duplex (TDD) special subframe; and based on the determination, receiving a signal of a downlink physical channel on the TDD special subframe including the DwPTS, wherein the determining is performed based on one or more of a size of the DwPTS and an operation mode of the NB-IoT cell, wherein the operation mode includes one or more of stand-alone, in-band, and guard-band modes, and wherein based on
(i) a signal of the downlink physical channel is received repeatedly on a plurality of subframes including the TDD special subframe, and
(ii) one or more REs within the TDD special subframe are available for a Narrowband reference signal (NRS):
the signal of the downlink physical channel is punctured on the corresponding RE.

2. The method of claim 1, wherein the downlink physical channel includes one or more of Narrowband Physical Downlink Shared Channel (NPDSCH) and Narrowband Physical Downlink Control Channel (NPDCCH).

3. The method of claim 1, further comprising:

receiving a signal of the downlink physical channel repeatedly on a plurality of subframes including the TDD special subframe and TDD downlink subframe.

4. The method of claim 3, wherein based on that a signal of the downlink physical channel is received repeatedly on the plurality of subframes, the signal of the downlink physical channel is mapped to resource elements (REs) within the TDD special subframe including the DwPTS, with reference to the TDD downlink subframe.

5. The method of claim 1, wherein a Narrowband reference signal (NRS) is mapped on third and fourth OFDM symbols within a first slot of the special subframe.

6. A Narrowband internet of Things (NB-IoT) device configured to receive a downlink physical channel, the NB-IoT device comprising:

a transceiver;

at least one processor; and at least one computer memory operably connectable to the at least one processor and storing instructions that, when executed by the at least one processor, perform operations comprising:

determining whether to receive a signal of a downlink physical channel from an NB-IoT cell on a Downlink Pilot Time Slot (DwPTS) of a Time Division Duplex (TDD) special subframe; and receiving a signal of a downlink physical channel on the TDD special subframe including the DwPTS, based on the determination, wherein the determination by the processor is performed, based on one or more of a size of the DwPTS and an operation mode of the NB-IoT cell, wherein the operation mode includes one or more of stand-alone, in-band, and guard-band modes, and wherein based on
(i) a signal of the downlink physical channel is received repeatedly on a plurality of subframes including the TDD special subframe, and
(ii) one or more REs within the TDD special subframe are available for a Narrowband reference signal (NRS):
the signal of the downlink physical channel is punctured on the corresponding RE.

7. The NB-IoT device of claim 6, wherein the downlink physical channel includes one or more of Narrowband Physical Downlink Shared Channel (NPDSCH) and Narrowband Physical Downlink Control Channel (NPDCCH).

8. The NB-IoT device of claim 6, wherein the processor is configured to receive a signal of the downlink physical channel repeatedly on a plurality of subframes including the TDD special subframe and TDD downlink subframe.

9. The NB-IoT device of claim 8, wherein based on that a signal of the downlink physical channel is received repeatedly on the plurality of subframes, the signal of the downlink physical channel is mapped to resource elements (REs) within the TDD special subframe including the DwPTS with reference to the TDD downlink subframe.

10. The NB-IoT device of claim 6, wherein a Narrowband reference signal (NRS) is mapped on third and fourth OFDM symbols within a first slot of the special subframe.

* * * * *